United States Patent
Fakoorian et al.

(10) Patent No.: US 12,170,996 B2
(45) Date of Patent: Dec. 17, 2024

(54) REPETITION INDICATION FOR PHYSICAL UPLINK CONTROL CHANNEL ENHANCEMENT

(71) Applicant: Apple Inc., Cupertino, CA (US)

(72) Inventors: Seyed Ali Akbar Fakoorian, San Diego, CA (US); Chunhai Yao, Beijing (CN); Chunxuan Ye, San Diego, CA (US); Dawei Zhang, Saratoga, CA (US); Haitong Sun, Cupertino, CA (US); Hong He, San Jose, CA (US); Huaning Niu, San Jose, CA (US); Oghenekome Oteri, San Diego, CA (US); Sigen Ye, Whitehouse Station, NJ (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/593,742

(22) PCT Filed: Jan. 14, 2021

(86) PCT No.: PCT/CN2021/071793
§ 371 (c)(1),
(2) Date: Sep. 23, 2021

(87) PCT Pub. No.: WO2022/151169
PCT Pub. Date: Jul. 21, 2022

(65) Prior Publication Data
US 2023/0345465 A1  Oct. 26, 2023

(51) Int. Cl.
*H04W 72/1268* (2023.01)
*H04L 1/16* (2023.01)
*H04W 72/20* (2023.01)

(52) U.S. Cl.
CPC .......... *H04W 72/1268* (2013.01); *H04L 1/16* (2013.01); *H04W 72/20* (2023.01)

(58) Field of Classification Search
CPC .......... H04W 72/1268; H04W 72/20; H04W 72/232; H04L 1/16; H04L 1/0072;
(Continued)

(56) References Cited

U.S. PATENT DOCUMENTS

2019/0098622 A1   3/2019  Lee
2020/0221448 A1   7/2020  Park
(Continued)

FOREIGN PATENT DOCUMENTS

| | | |
|---|---|---|
| CN | 110583081 A | 12/2019 |
| KR | 20180136798 A | 12/2018 |
| WO | 2020215228 A1 | 10/2020 |

OTHER PUBLICATIONS

China Telecom, "Discussion on PUCCH coverage enhancements," 3GPP Draft; R1-2007995, 3rd Generation Partnership Project (3GPP), Mobile Competence Centre ; 650, route des Lucioles ; F-06921 Sophia-Antipolis Cedex ; France, Mobile Competence Centre ; 650, route des Lucioles ; F-06921 Sophia-Antipolis Cedex ; France , (Oct. 16, 2020), vol. RAN WG1, No. e-Meeting; Oct. 26, 2020-Nov. 13, 2020, XP051939425.
(Continued)

*Primary Examiner* — Vinncelas Louis
(74) *Attorney, Agent, or Firm* — Blank Rome LLP

(57) ABSTRACT

A wireless node comprising a radio, and a processor operably coupled to the radio, wherein the processor is configured to determine a number of physical uplink control channel (PUCCH) resource repetitions for transmitting a PUCCH message; and wherein the radio is configured to transmit an indication, to a wireless device, of the number of PUCCH repetitions for a PUCCH message, and receive
(Continued)

repetitions of the PUCCH message from the wireless device based on the number of PUCCH repetitions.

18 Claims, 19 Drawing Sheets

(58) Field of Classification Search
CPC ..... H04L 1/0057; H04L 1/1819; H04L 1/189; H04L 5/0048; H04L 1/0067; H04L 1/1896; H04L 1/08
See application file for complete search history.

(56) References Cited

U.S. PATENT DOCUMENTS

| | | |
|---|---|---|
| 2020/0404692 A1 | 12/2020 | Yin |
| 2022/0030443 A1 | 1/2022 | Chen |
| 2023/0276447 A1* | 8/2023 | Matsumura ............ H04L 1/1896 |
| 2023/0284222 A1* | 9/2023 | Sun ....................... H04L 1/0067 370/329 |
| 2023/0299906 A1* | 9/2023 | Yuan ..................... H04L 5/0048 370/329 |
| 2023/0379032 A1* | 11/2023 | Blankenship ....... H04W 72/232 |
| 2024/0015748 A1* | 1/2024 | Kittichokechai ......... H04L 1/08 |

OTHER PUBLICATIONS

Vivo, "Discussion on Solutions for PUCCH coverage enhancement," 3GPP Draft; R1-2007681, 3rd Generation Partnership Project (3GPP), Mobile Competence Centre ; 650, route des Lucioles ; F-06921 Sophia-Antipolis Cedex ; France, Mobile Competence Centre ; 650, route des Lucioles ; F-06921 Sophia-Antipolis Cedex ; France , (Oct. 17, 2020), vol. RAN WG1, No. e-Meeting; Oct. 26, 2020-Nov. 13, 2020, XP051939838.

* cited by examiner

REPETITION INDICATION FOR PHYSICAL UPLINK CONTROL CHANNEL ENHANCEMENT

FIELD

The present application relates to wireless devices and wireless networks, including devices, circuits, and methods for a repetition indication for enhancing physical uplink control channel (PUCCH) processing.

BACKGROUND

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Aspects disclosed herein relate to devices, circuits, and methods related to wireless networking and more specifically to message repetition. In this disclosure, solutions are proposed for open issues regarding repetition indication for PUCCH. These solutions include: an implicit and/or explicit mechanism to indicate number of repetitions; an indication of repetition type; a UE capability for additional processing for back-to-back PUCCH repetitions; and a need to change current overlapping rules.

According to aspects of the present disclosure, a technique for wireless communications in a wireless system including: a wireless node comprising: a radio; and a processor operably coupled to the radio, wherein the processor is configured to: determine a number of physical uplink control channel (PUCCH) resource repetitions for transmitting a PUCCH message; and wherein the radio is configured to: transmit an indication, to a wireless device, of the number of PUCCH repetitions for a PUCCH message; and receive repetitions of the PUCCH message from the wireless device based on the number of PUCCH repetitions.

Another aspect relates to a method for wireless networking, the method comprising: determining a supported number of physical uplink control channel (PUCCH) resources to transmit in a slot; determining whether intra-slot PUCCH repetition is supported; transmitting, to a wireless node, an indication of the determined number of PUCCH resources to transmit in the slot and whether intra-slot PUCCH repetition is supported.

Another aspect relates to a method for wireless networking by a wireless device, the method comprising: receiving an indication, from a wireless node, of the number of PUCCH repetitions for a PUCCH message; and repeating a transmission of the PUCCH message based on the number of PUCCH repetitions.

The techniques described herein may be implemented in and/or used with a number of different types of devices, including but not limited to cellular phones, wireless devices, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

A better understanding of the present subject matter can be obtained when the following detailed description of various aspects is considered in conjunction with the following drawings.

Figure 1:
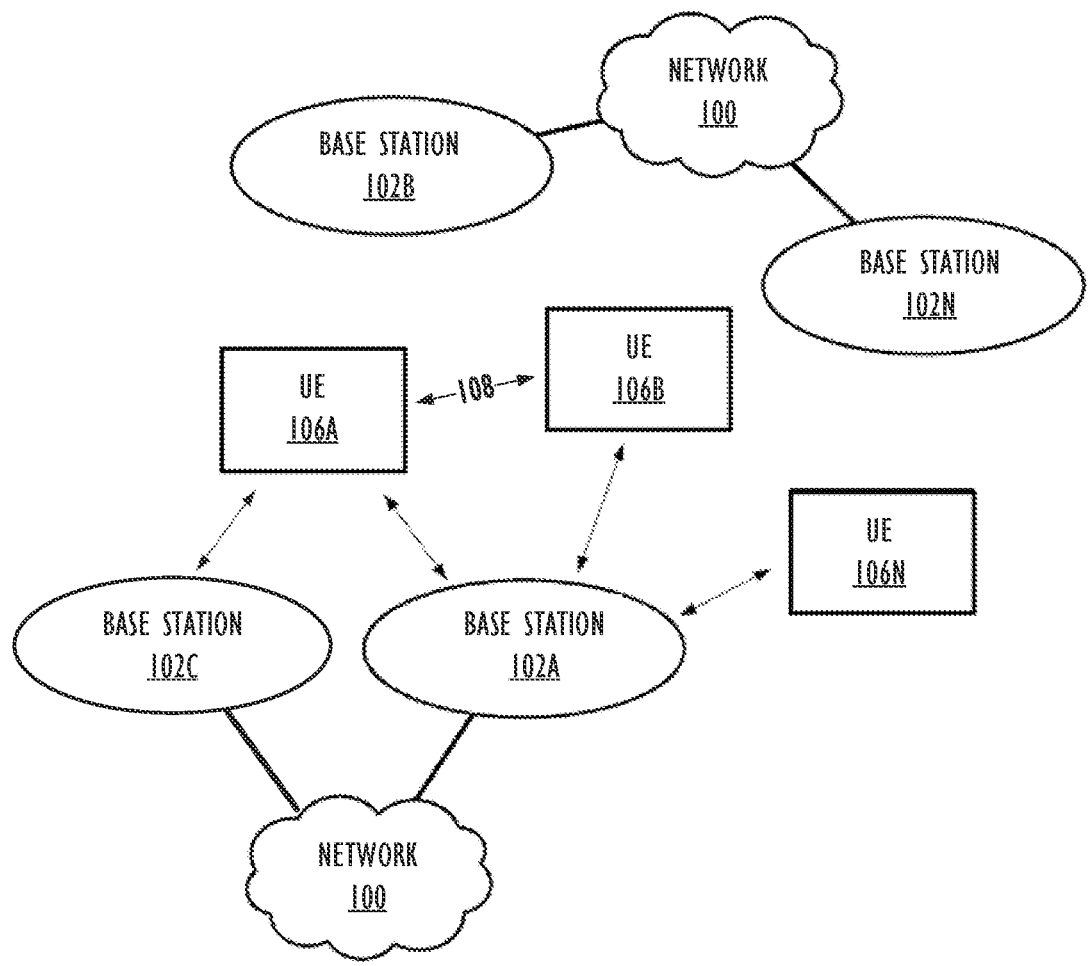
FIG. 1 illustrates an example wireless communication system, according to some aspects.

While the features described herein may be susceptible to various modifications and alternative forms, specific aspects thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

The following is a glossary of terms that may be used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (also "User Device" or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, other handheld devices, in-vehicle infotainment (IVI), in-car entertainment (ICE) devices, an instrument cluster, head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine type communications (MTC) devices, machine-to-machine (M2M), internet of things (IoT) devices, etc. In general, the terms "UE" or "UE device" or "user device" can be broadly defined to encompass any electronic, computing, and/or telecommunications device (or combination of devices) that is easily transported by a user (or vehicle) and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "base station" or "wireless station" has the full breadth of its ordinary meaning, and at least includes a wireless communication station installed at a fixed location and used to communicate as part of a wireless telephone system or radio system. For example, if the base station is implemented in the context of LTE, it may alternately be referred to as an 'eNodeB' or 'eNB'. If the base station is implemented in the context of 5G NR, it may alternately be referred to as a 'gNodeB' or 'gNB'. Although certain aspects are described in the context of LTE or 5G NR, references to "eNB," "gNB," "nodeB," "base station," "NB," etc., may refer to one or more wireless nodes that service a cell to provide a wireless connection between user devices and a wider network generally and that the concepts discussed are not limited to any particular wireless technology. Although certain aspects are described in the context of LTE or 5G NR, references to "eNB," "gNB," "nodeB," "base station," "NB," etc., are not intended to limit the concepts discussed herein to any particular wireless technology and the concepts discussed may be applied in any wireless system.

Node—The term "node," or "wireless node" as used herein, may refer to one more apparatus associated with a cell that provide a wireless connection between user devices and a wired network generally.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form but not be involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some aspects, "approximately" may mean within 0.1% of some specified or desired value, while in various other aspects, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Example Wireless Communication System

Turning now to FIG. 1, a simplified example of a wireless communication system is illustrated, according to some aspects. It is noted that the system of FIG. 1 is merely one example of a possible system, and that features of this disclosure may be implemented in any of various systems, as desired.

As shown, the example wireless communication system includes a base station 102A, which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

In some aspects, the UEs 106 may be IoT UEs, which may comprise a network access layer designed for low-power IoT applications utilizing short-lived UE connections. An IoT UE can utilize technologies such as M2M or MTC for exchanging data with an MTC server or device via a public land mobile network (PLMN), proximity service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. As an example, vehicles to everything (V2X) may utilize ProSe features using a PC5 interface for direct communications between devices. The IoT UEs may also execute background applications (e.g., keep-alive messages, status updates, etc.) to facilitate the connections of the IoT network.

As shown, the UEs 106, such as UE 106A and UE 106B, may directly exchange communication data via a PC5 interface 108. The PC5 interface 105 may comprise one or more logical channels, including but not limited to a Physical Sidelink Shared Channel (PSSCH), a Physical Sidelink Control Channel (PSCCH), a Physical Sidelink Broadcast Channel (PSBCH), and a Physical Sidelink Feedback Channel (PSFCH).

In V2X scenarios, one or more of the base stations 102 may be or act as Road Side Units (RSUs). The term RSU may refer to any transportation infrastructure entity used for V2X communications. An RSU may be implemented in or by a suitable wireless node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Intelligent Transport Systems (ITS) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communications. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells." Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some aspects, base station 102A may be a next generation base station, e.g., a 5G New Radio (5G NR) base station, or "gNB." In some aspects, a gNB may be connected to a legacy evolved packet core (EPC) network and/or to a NR core (NRC)/5G core (5GC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station). For example, as illustrated in FIG. 1, both base station 102A and base station 102C are shown as serving UE 106A.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

Example User Equipment (UE)

Figure 2:
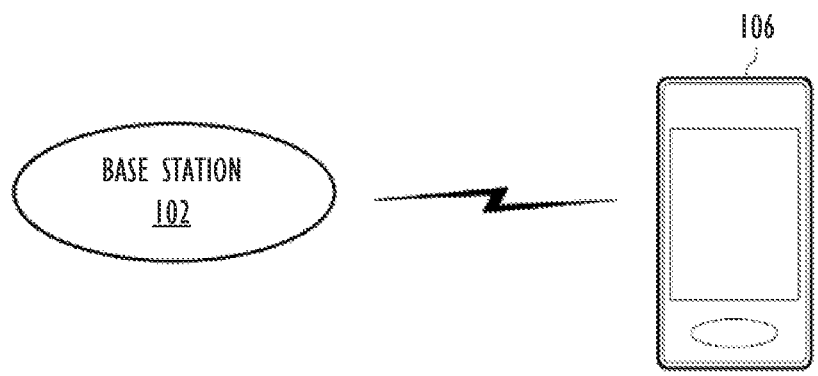
FIG. 2 illustrates a base station (BS) in communication with a user equipment (UE) device, according to some aspects.

FIG. 2 illustrates user equipment 106 (e.g., one of the devices 106A through 106N) in communication with a base station 102, according to some aspects. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method aspects described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method aspects described herein, or any portion of any of the method aspects described herein.

The UE 106 may include one or more antennas for communicating using one or more wireless communication protocols or technologies. In some aspects, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some aspects, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

In some aspects, a downlink resource grid can be used for downlink transmissions from any of the base stations 102 to the UEs 106, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid may comprise a number of resource blocks, which describe the mapping of certain physical channels to resource elements. Each resource block comprises a collection of resource elements. There are several different physical downlink channels that are conveyed using such resource blocks.

The physical downlink shared channel (PDSCH) may carry user data and higher-layer signaling to the UEs 106. The physical downlink control channel (PDCCH) may carry information about the transport format and resource allocations related to the PDSCH channel, among other things. It may also inform the UEs 106 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the base stations 102 based on channel quality information fed back from any of the UEs 106. The downlink resource assignment information may be sent on the PDCCH used for (e.g., assigned to) each of the UEs.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Example Communication Device

Figure 3:
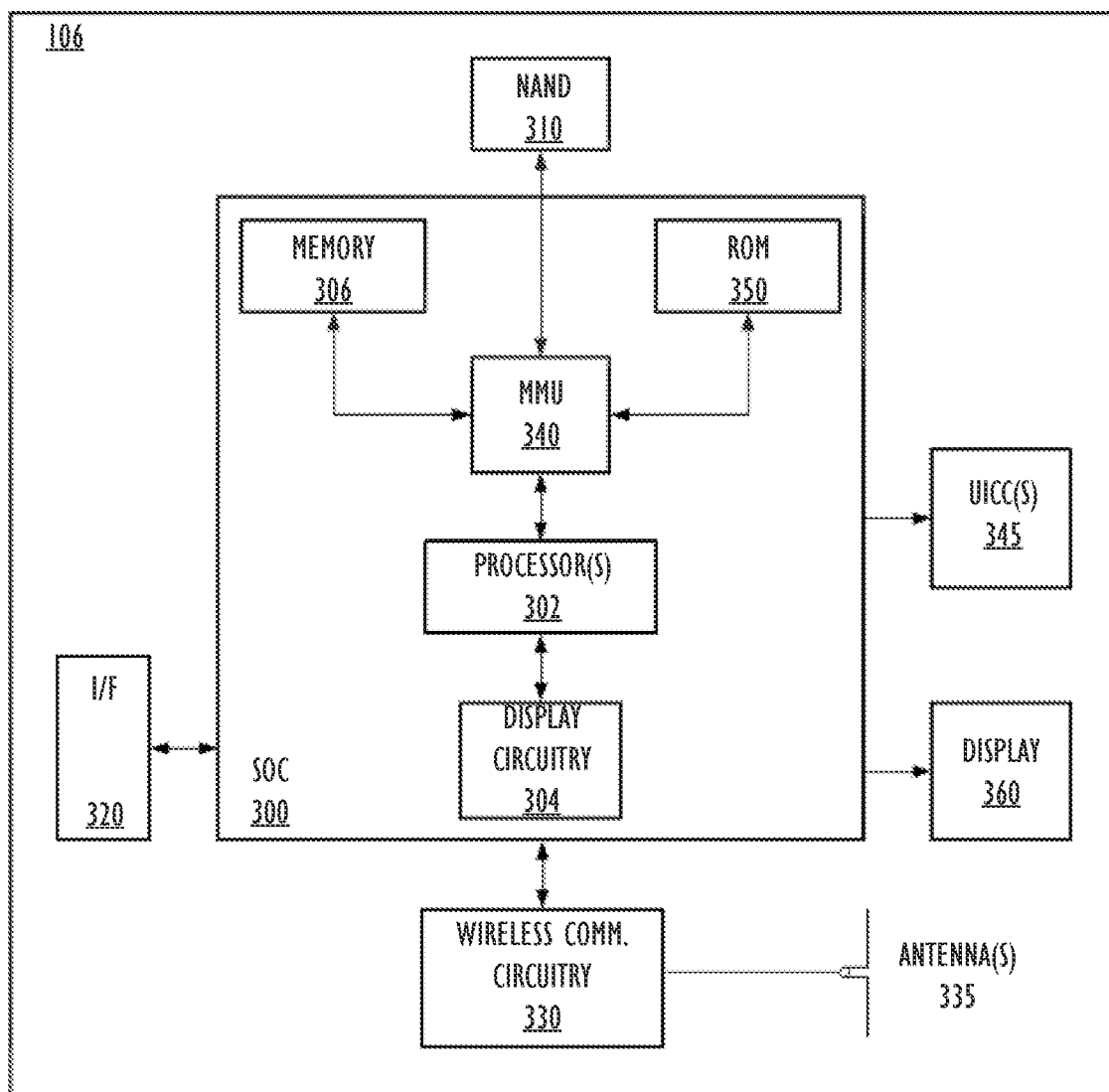
FIG. 3 illustrates an example block diagram of a UE, according to some aspects.

FIG. 3 illustrates an example simplified block diagram of a communication device 106, according to some aspects. It is noted that the block diagram of the communication device of FIG. 3 is only one example of a possible communication device. According to aspects, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some aspects, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some aspects, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some aspects, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain. In some aspects, the second RAT may operate at mmWave frequencies. As mmWave systems operate in higher frequencies than typically found in LTE systems, signals in the mmWave frequency range are heavily attenuated by environmental factors. To help address this attenuating, mmWave systems often utilize beamforming and include more antennas as compared LTE systems. These antennas may be organized into antenna arrays or panels made up of individual antenna elements. These antenna arrays may be coupled to the radio chains.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some aspects, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Example Base Station

Figure 4:
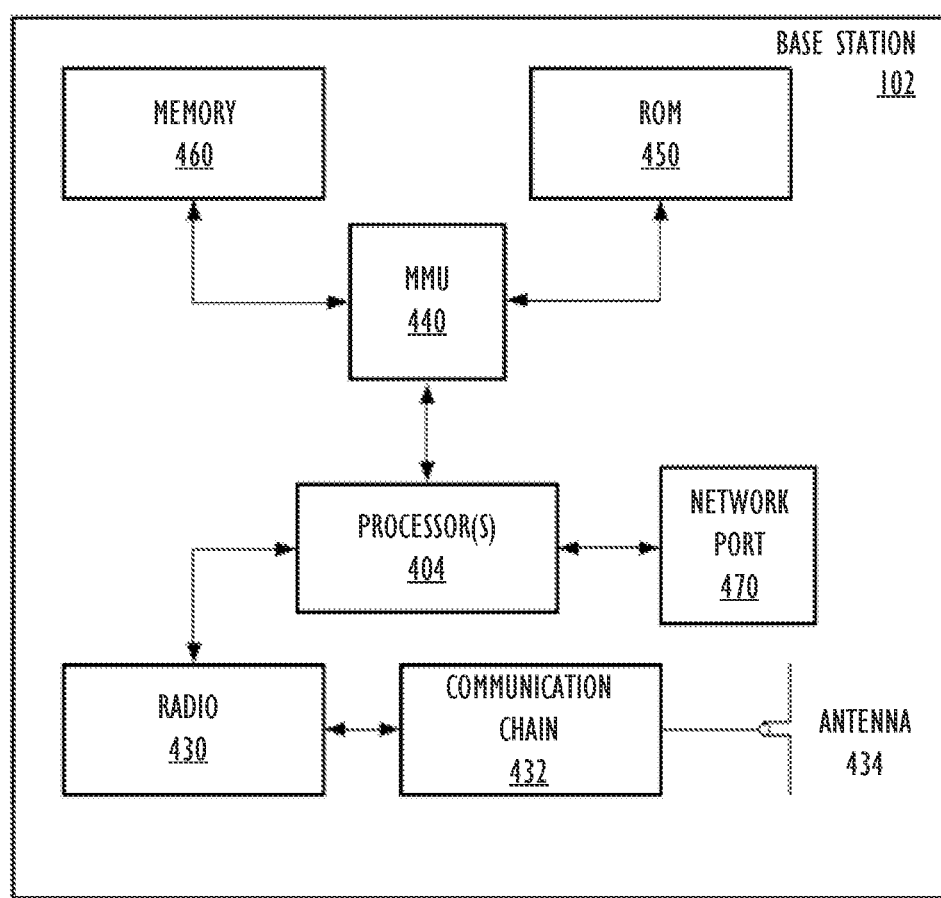
FIG. 4 illustrates an example block diagram of a BS, according to some aspects.

FIG. 4 illustrates an example block diagram of a base station 102, according to some aspects. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor (s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some aspects, base station 102 may be a next generation base station, e.g., a 5G New Radio (5G NR) base station, or "gNB." In such aspects, base station 102 may be connected to a legacy evolved packet core (EPC) network and/or to a NR core (NRC)/5G core (5GC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. When the base station 102 supports mmWave, the 5G NR radio may be coupled to one or more mmWave antenna arrays or panels. As another possibility, the base station 102 may include a multi-mode radio, which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Example Cellular Communication Circuitry

Figure 5:
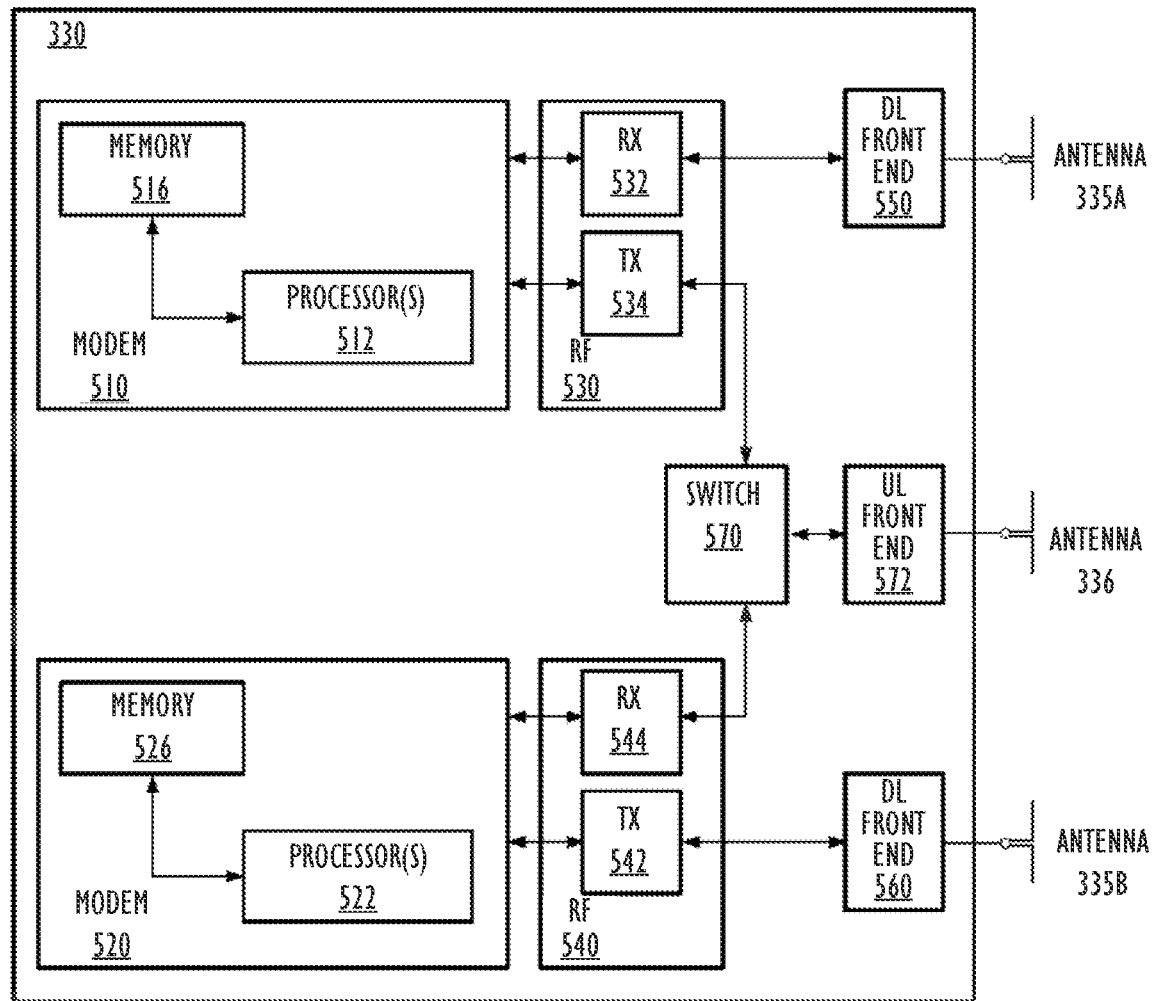
FIG. 5 illustrates an example block diagram of cellular communication circuitry, according to some aspects.

FIG. 5 illustrates an example simplified block diagram of cellular communication circuitry, according to some aspects. It is noted that the block diagram of the cellular communication circuitry of FIG. 5 is only one example of a possible cellular communication circuit, other circuits, such as circuits including or coupled to sufficient antennas for different RATs to perform uplink activities using separate antennas, or circuits including or coupled to fewer antennas, e.g., that may be shared among multiple RATs, are also possible. According to some aspects, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown. In some aspects, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some aspects, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some aspects, receive circuitry 542 may be in communication with DL front end 560, which may include circuitry for receiving radio signals via antenna 335b.

In some aspects, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some aspects, the cellular communication circuitry 330 may include only one transmit/receive chain. For example, the cellular communication circuitry 330 may not include the modem 520, the RF front end 540, the DL front end 560, and/or the antenna 335b. As another example, the cellular communication circuitry 330 may not include the modem 510, the RF front end 530, the DL front end 550, and/or the antenna 335a. In some aspects, the cellular communication circuitry 330 may also not include the switch 570, and the RF front end 530 or the RF front end 540 may be in communication, e.g., directly, with the UL front end 572.

Example Network Element

Figure 6:
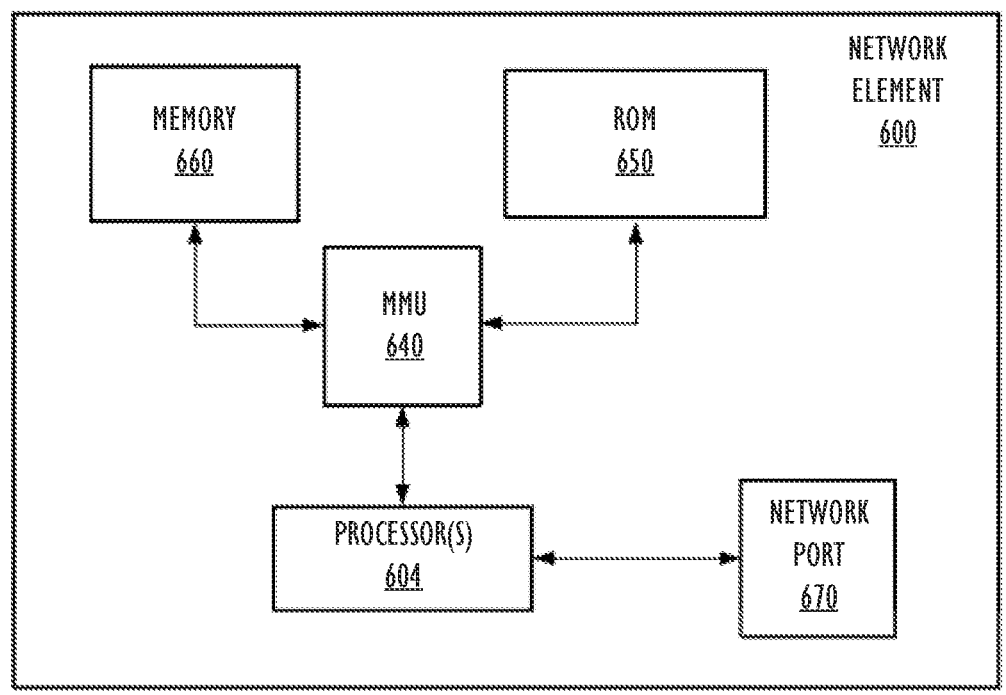
FIG. 6 illustrates an example block diagram of a network element, according to some aspects.

FIG. 6 illustrates an exemplary block diagram of a network element 600, according to some aspects. According to some aspects, the network element 600 may implement one or more logical functions/entities of a cellular core network, such as a mobility management entity (MME), serving gateway (S-GW), access and management function (AMF), session management function (SMF), network slice quota management (NSQM) function, etc. It is noted that the network element 600 of FIG. 6 is merely one example of a possible network element 600. As shown, the core network element 600 may include processor(s) 604 which may execute program instructions for the core network element 600. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The network element 600 may include at least one network port 670. The network port 670 may be configured to couple to one or more base stations and/or other cellular network entities and/or devices. The network element 600 may communicate with base stations (e.g., eNBs/gNBs) and/or other network entities/devices by means of any of various communication protocols and/or interfaces.

As described further subsequently herein, the network element 600 may include hardware and software components for implementing and/or supporting implementation of features described herein. The processor(s) 604 of the core network element 600 may be configured to implement or support implementation of part or all of the methods described herein, e.g., by executing program instructions stored on a memory medium (e.g., a nontransitory computer-readable memory medium). Alternatively, the processor 604 may be configured as a programmable hardware element, such as an FPGA (Field Programmable Gate Array), or as an ASIC (Application Specific Integrated Circuit), or a combination thereof.

Wireless Channels

Wireless systems, such as NR systems, may include separate control and data channels. For example, NR systems may include a physical uplink control channel (PUCCH) carrying uplink control information in a control region of a transmission. The data region may be allocated to a physical uplink shared channel (PUSCH) carrying user data. In the NR system, data can be transmitted from a gNB to the UE via a physical downlink shared channel (PDSCH). A physical uplink control channel (PUCCH) can be used to acknowledge that data was received. Downlink and uplink channels or transmissions can use time-division duplexing (TDD) or frequency-division duplexing (FDD). A demodulation reference signal (DMRS) is generally embedded in PUCCH, PUSCH, and PDSCH transmissions. The DMRS provides a phase reference used for demodulating data for these channels and for channel estimation and is therefore specific to each UE. In certain cases, DMRS design may be specific to each channel and may be configurable as needed. For example, a gNB may transmit via radio resource control (RRC), scheduling and configuration information for, among other channels, PUCCH, PUSCH, and PDSCH. This scheduling information may be semi-static and may define how and when to transmit or receive the PUCCH, PUSCH, and PDSCH for a period of time.

PUCCH Repetition

Figure 7:
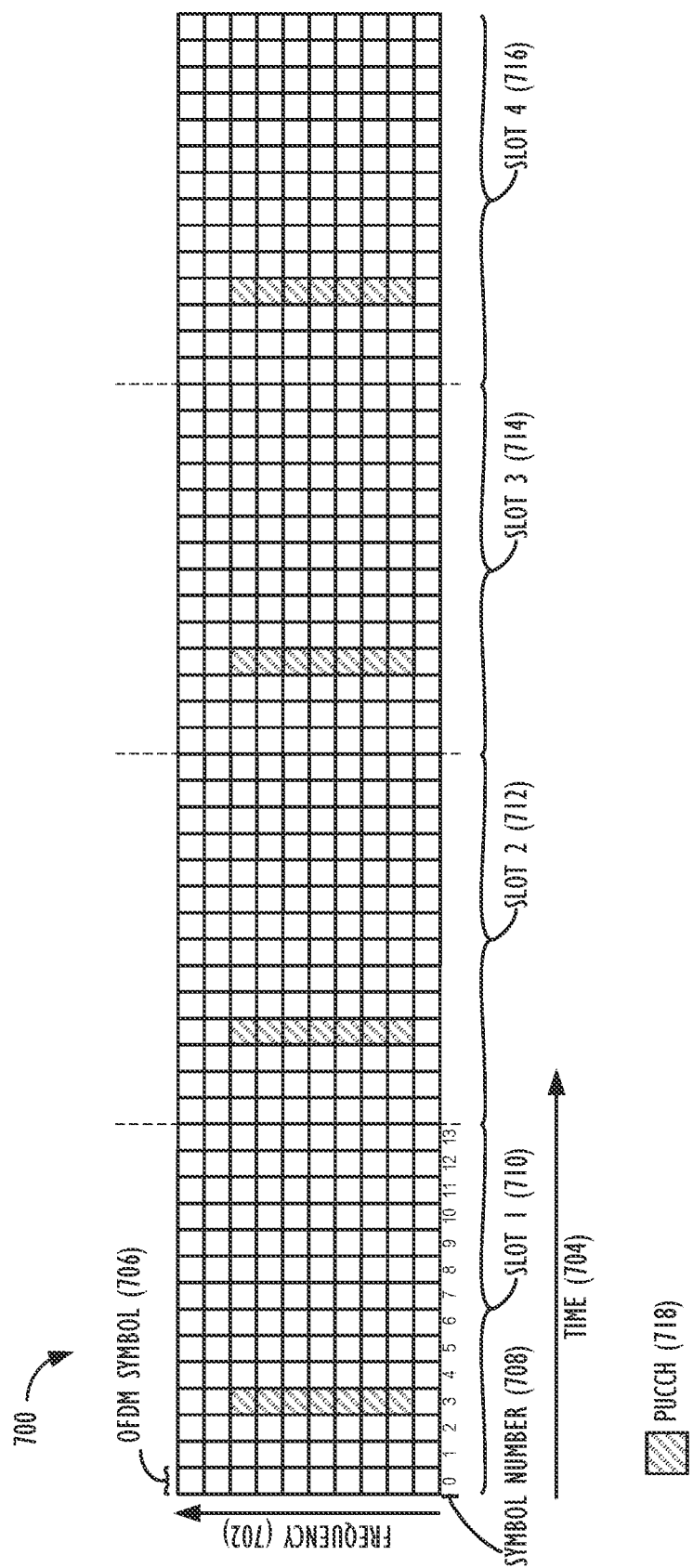
FIG. 7 is a channel resource grid illustrating PUCCH repetition, in accordance with aspects of the present disclosure.

FIG. 7 is a channel resource grid 700 illustrating PUCCH repetition, in accordance with aspects of the present disclosure. Resource grid 700 includes a vertical axis 702 corresponding to a frequency domain and a horizontal axis 704 corresponding to a time domain. Each block in the grid 700 represents a resource block (RB). Each column of RBs in grid 700 corresponds to a single orthogonal frequency division multiplexing (OFDM) symbol 706 in the time domain 704. The symbol index numbers 708 are also labeled across the horizontal time axis 704 for illustrative purposes. A slot (e.g., slot 1 710) may include 14 OFDM symbols (706), and four slots (e.g., slot 1 710, slot 2 712, slot 3 714, and slot 4 716) are shown in this example. In certain cases, the NR system may be configured to use different numbers of symbols per slot (e.g., 12), if so desired.

Some PUCCH formats may be configured to repeat across multiple slots. In some cases, PUCCH repetition may occur within a slot. This repetition helps improve reliability and PUCCH coverage. For example, the long PUCCH formats, formats 1, 3, and 4, may be configured with repetition across multiple slots. In this example, PUCCH 718 is configured to be repeated four times across slot 1 710, slot 2 712, slot 3 714, and slot 4 716. As shown each PUCCH repetition uses the same number of symbols and starts at the same starting symbol within each slot. A value, nrofSlots (e.g., nrofSlots=4) may indicate a total number of transmissions for the PUCCH 718. In current wireless networks, the value nrofSlots is a higher layer parameter, provided by a layer higher than the PHY layer, such as via network layer signaling such as RRC, and is semi-statically indicated. However, there is a relatively higher amount of latency involved with semi-static indication via RRC and thus the value of nrofSlots, when set, applies across multiple PUCCH messages. As used herein, a PUCCH message includes an initial PUCCH transmission along with associated repetitions of the PUCCH transmission. This latency can result in a mismatch between a number of repetitions needed for a PUCCH message and the setting of nrofSlots at a cost of resource utilization.

In accordance with aspects of the present disclosure, the value of nrofSlots may be indicated for each PUCCH message using lower layer signaling. This indication may be explicit or implicit. In some cases, nrofSlots may be explicitly indicated for each PUCCH. As an example of explicit indication, multiple sets of PUCCH resources may be defined with different nrofSlots configurations. These multiple sets of PUCCH resources may be transmitted to the wireless device, for example, via RRC signaling, preconfiguring the wireless device. These multiple sets of PUCCH resources may be substantially all of the PUCCH resource sets that are configurable as between the wireless node and the wireless device.

The wireless node may then indicate to the wireless device a sub-set of PUCCH resource sets, from the multiple sets of PUCCH resources, by selecting one or more PUCCH resources from the multiple sets of PUCCH resources and transmitting an indication of the selected one or more PUCCH resources to the wireless device, for example, via MAC-CE signaling. In certain cases, the one or more PUCCH resources may indicate a specific PUCCH resource, or a sub-set of PUCCH resources. After an indication of the selected one or more PUCCH resources is sent via MAC-CE, another indication may be sent, for example, via a DCI message of the PHY layer, indicating a specific PUCCH resource, of the selected one or more PUCCH resources, should be used by the wireless device. The specific PUCCH resource may include a nrofSlots parameter indicating a number of repetitions for a specific PUCCH message. In certain cases, if the nrofSlots parameter is omitted, the PUCCH message may not be repeated. Using MAC-CE signaling on the network layer to select a sub-set of PUCCH resource sets helps narrow down the multiple sets of PUCCH resources and makes indicating a specific PUCCH resource via DCI easier. The wireless device may then use the specific PUCCH resource to transmit a PUCCH message As another example of explicit indication, a DCI message indicating a specific PUCCH resource to use may be transmitted to the wireless device. This DCI message may include a PUCCH resource indicator (PRI). The PRI may indicate a nrofSlots parameter indicating a number of repetitions for a specific PUCCH message. For example, the nrofSlots may be predefined for the PUCCH resources of the multiple PUCCH resource sets. In certain cases, if the nrofSlots parameter may be omitted, indicating that the PUCCH message may not be repeated. The DCI message may need to be expanded to include extra bits to accommodate bits of the PRI. Alternatively, existing fields may be repurposed to accommodate the PRI.

In accordance with aspects of the present disclosure, a number of repetitions for a PUCCH message may also be implicitly indicated. With respect to implicit indication, a number of repetitions for a PUCCH message may be inferred based on a PDCCH aggregation level and/or a PDSCH aggregation factor corresponding to the PUCCH. The number of repetitions of the PUCCH message may be based on the PDSCH aggregation factor and/or PDCCH aggregation level as the PUCCH may be used for hybrid automatic repeat request (HARQ) acknowledgment of the PDSCH and/or PDCCH. If the PDSCH and/or PDCCH utilized coverage extension using a PDSCH aggregation factor and/or PDCCH aggregation factor, then it is likely that the PUCCH could also utilize coverage extension as provided by an increased number of repetitions. In certain cases, as the aggregation factor and/or aggregation level is increased, the number of repetitions may also be increased.

Similarly, a number of repetitions for a PUSCH message may also be implicitly indicated. This implicit indication may be based, for example, an aggregation level of a PDCCH message scheduling the dynamic grant PUSCH (DG-PUSCH). Another example of the implicit indication may be an aggregation level of a PDCCH message activating a type-2 configured grant PUSCH (CG-PUSCH). The wireless node may determine an aggregation level of a PDCCH for transmitting a PDCCH message scheduling a PUSCH message, such as scheduling a DG-PUSCH or activating a type-2 CG-PUSCH. The wireless node may then transmit the PDCCH message to the wireless device. The wireless device may infer a number of repetitions of the PUSCH based on the aggregation level of the received PDCCH and transmit a number of repetitions of the PUSCH message based on the inferred number of repetitions.

PUCCH Repetition Type

Figure 8:
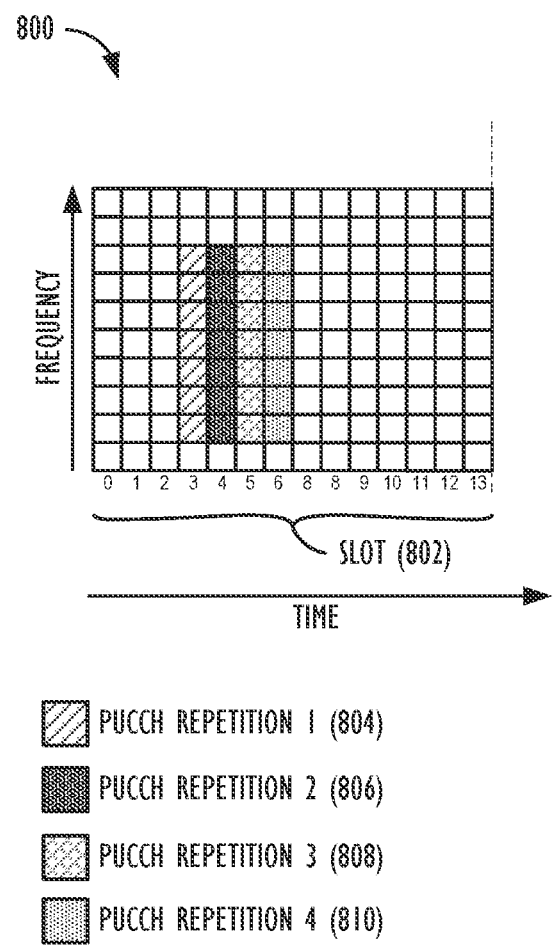
FIG. 8 is a channel resource grid illustrating back-to-back PUCCH repetition, in accordance with aspects of the present disclosure.

As discussed above, FIG. 7 illustrates an example of slot based PUCCH repetition where the PUCCH message is repeated in consecutive slots, in a same location within the consecutive slots. If one or more symbols within a repetition is not useable for a PUCCH repetition, such as due to a scheduling conflict, then a PUCCH may be dropped. Spreading out the PUCCH repetition over time may increase a chance of such scheduling issues. In certain cases, PUCCH repetitions may be scheduled back-to-back. FIG. 8 is a channel resource grid 800 illustrating back-to-back PUCCH repetition, in accordance with aspects of the present disclosure. In back-to-back repetition, a signal, such as a PUCCH signal, transmitted in a first symbol of a slot and is then repeated in the next symbol of the slot. In this example, a PUCH signal may be repeated four times and a first PUCCH repetition 804 may be transmitted in a slot 802 in symbol 3. After the first PUCCH repetition 804, a second PUCCH repetition 806 is transmitted in symbol 4, a third PUCCH repetition 808 is transmitted in symbol 5, and similarly a fourth PUCCH repetition 810 is transmitted in symbol 6. In certain cases, a type of PUCCH repetition may be indicated for a PUCCH message.

In accordance with aspects of the present disclosure, an indication of a type of repetition to perform may also be included in the indication of a specific PUCCH resource to use for a PUCCH message. This indication may also be explicit or implicit. In some cases, a type of PUCCH repetition for a PUCCH message may be explicitly signaled. As an example of explicit indication, where a wireless device is preconfigured with multiple sets of PUCCH resources, certain PUCCH resources of the multiple sets of PUCCH resources may include an indication of a PUCCH repetition type. This indication of a PUCCH repetition type may be included in all of the multiple sets of PUCCH resources, or, alternatively, the PUCCH repetition type may be included in PUCCH resources which use slot based repetition (or back-to-back repetition), and the PUCCH repetition type omitted in PUCCH resources with use back-to-back repetition (or slot based repetition), respectively.

As another example of explicit indication, a DCI message indicating a specific PUCCH resource, including a PUCCH repetition type, to use may be transmitted to the wireless device. This indication of a PUCCH repetition type may be included in all of the multiple sets of PUCCH resources, or, alternatively, the PUCCH repetition type may be included in PUCCH resources which use slot based repetition (or back-to-back repetition), and the PUCCH repetition type omitted in PUCCH resources with use back-to-back repetition (or slot based repetition), respectively. The DCI message may need to be expanded, or existing fields repurposed, to include an extra bit indicating the PUCCH repetition type.

In accordance with aspects of the present disclosure, an indication of a type of repetition to perform may also be implicitly indicated. As an example of implicit indication, back-to-back repetition of the PUCCH may be indicated if back-to-back repetition does not cross a slot boundary. As a more detailed example, slot-based repetition may be implied if a parameter indicating a number of symbols needed by the PUCCH (nrofSymbols) is not more than half of the number of symbols in a slot, or if back-to-back repetition of the PUCCH otherwise implies a slot boundary crossing. In numbers, for a given slot with fourteen symbols, if a number of symbols needed by the PUCCH (nrofSymbols) is greater than seven, any number of repetitions of the PUCCH would cross the slot boundary. Therefore, slot-based repetition is implied. As another example, if a PUCCH message with four repetitions is scheduled for symbol thirteen of a slot with fourteen symbols, the PUCCH message would cross the slot boundary and therefore, slot-based repetition is implied. As another example, if a PUCCH message with four repetitions is scheduled for symbol two of a slot with fourteen symbols, then back-to-back repetition may be implicitly indicated as the four repetitions of the PUCCH message would not cross the slot boundary.

PUCCH Coding Gain

In current wireless systems, each repetition of the PUCCH messages transmits the same set of coded bits. For example, a PUCCH message may be encoded via polar encoding using (K, N) encode values, where K may be obtained from an uplink control information (UCI) payload size and N may be based on an available number of resource elements per repetition, to generate an encoded PUCCH message and this same encoded PUCCH message is transmitted for each repetition. Output of a polar encoder may be based in part of a N length of the polar code and a K number of information bits. As the same encoded bits of the PUCCH message are repeated, there is no coding gain with each PUCCH repetition. In accordance with aspects of the current disclosure, redundancy versions may be indicated for PUCCH repetitions to enhance PUCCH encoding. In some cases, redundancy versions may be used to perform polar encoding based on (K, N') instead of (K, N), where N' is based on an available number of resource elements across a certain number of repetitions. In certain cases, the number of repetitions may be two nominal repetitions, with two corresponding redundancy version indices, four nominal repetitions, with four corresponding redundancy version indices, or all nominal repetitions, with the number of corresponding redundancy version indices equal to the number of repetitions (e.g., nrofRep).

The redundancy version indices may be indicated to a wireless device via RRC configuration and/or indicated via DCI. For example, redundancy version indices may be included in the multiple sets of PUCCH resources with specific redundancy version indices included in the multiple sets of PUCCH resources. In some cases, the redundancy version indices may be included in a DCI message, such as the DCI message indicating a specific PUCCH resource. The redundancy version indices may indicate which set of encoded bits are included for each repetition. For example, where there are two nominal repetitions, the two redundancy version indices may be {0,1}, where there are four nominal repetitions, the four redundancy version indices may be {0,2,3,1}, etc. As a more detailed example, in the case there are four nominal repetitions with four redundancy version indices set at {0,2,3,1}, the first PUCCH repetition may include the first set of encoded bits, the second PUCCH repetition may include the third set of encoded bits, the third PUCCH repetition may include the fourth set of encoded bits, and the fourth PUCCH repetition may include the second set of encoded bits. In some cases, a starting redundancy version index may be sent via DCI for the first PUCCH repetition and each further repetition can use a next redundancy index based on a pattern. For example, where there are four nominal repetitions, the four redundancy version indices may be {0,2,3,1}, and an indicated redundancy index of 2 is received, the first PUCCH repetition may include the fourth set of bits, the second PUCCH repetition may include the second set of encoded bits, the third PUCCH repetition may include the first set of encoded bits, and the fourth PUCCH repetition may include the third set of encoded bits. It should be understood that the specific redundancy version indices shown above are exemplary and other redundancy version indices are possible.

Wireless Device PUCCH Capability

In accordance with aspects of the present disclosure, a wireless device may indicate a number of PUCCH transmission per slot the wireless device supports. For example, a wireless device may send wireless device capability information to a wireless network, such as during a connection procedure. The wireless device capability information may include an indication of a number of PUCCH transmissions per slot the wireless device supports. The number of PUCCH transmissions per slot may vary. In some cases, the wireless device may indicate that the wireless device supports M PUCCH transmissions per slow, where these PUCCH transmissions may include intra-slot PUCCH repetitions. In other cases, the wireless device may indicate that the wireless device supports $M_1$ PUCCH transmissions per slot, where none of these PUCCH transmissions include intra-slot PUCCH repetitions, and that the wireless device supports $M_2$ PUCCH transmissions per slot, where some of these PUCCH transmissions include intra-slot PUCCH repetitions. The specific capability numbers of M, $M_1$, and $M_1$ may vary based on the UCI type of the schedule PUCCH message, such as for HARQ-ACK/scheduling request (SR)/CSI configurations.

PUCCH Overlap Handling

In certain cases, a wireless device may be scheduled with multiple, overlapping PUCCH transmissions. For example, a wireless device may receive an indication to transmit a first PUCCH message (including repetitions) in a certain set of slots. If a second PUCCH message (including repetitions) is scheduled to be transmitted in any slot that the first PUCCH message is also scheduled to be transmitted in, the first PUCCH and second PUCCH overlap. In some cases, if the first PUCCH message is dynamically indicated (e.g., a value of nrofSlots indicated for the first PUCCH message) and the second PUCCH message is also dynamically indicated, then a determination as to which PUCCH to message transmit may be made based on a set of criteria. In some cases, this set of criteria may be based on a UCI type in the PUCCH message where HARQ-ACK>SR>CSI. Thus, the PUCCH message associated with the higher priority UCI type would be transmitted, per schedule, during the overlapping period instead of the PUCCH message with the lower priority UCI type. If the overlapping first PUCCH message and the second PUCCH message both include a UCI type having the same priority, the wireless device may transmit the PUCCH message that starts at an earlier slot or symbol and drop the transmission of the second PUCCH message.

In some cases, if a first PUCCH message is dynamically indicated and the second PUCCH message is not dynamically weighted then a determination as to which PUCCH to message transmit may be made based on another set of criteria. This set of criteria may also be based on a UCI type priority in the PUCCH message, where UCI type HARQ-ACK>SR>CSI. In some cases, if a UCI type in the first PUCCH message has a same priority as a UCI type in the second PUCCH message, then the wireless device may transmit the PUCCH that is dynamically scheduled (e.g., first PUCCH) and drop the transmission of the PUCCH that is not dynamically scheduled (e.g., second PUCCH message), regardless of when the first PUCCH message and second PUCCH message start. In some cases where the overlapping PUCCH messages have different UCI types, the wireless device may not expect that the PUCCH that is not dynamically scheduled (e.g., second PUCCH message) to have a UCI with a higher priority than the PUCCH that is dynamically scheduled (e.g., first PUCCH message). Thus, the wireless device may always transmit the PUCCH that is dynamically scheduled if two overlapping PUCCH messages with different UCI types are scheduled.

Figure 9:
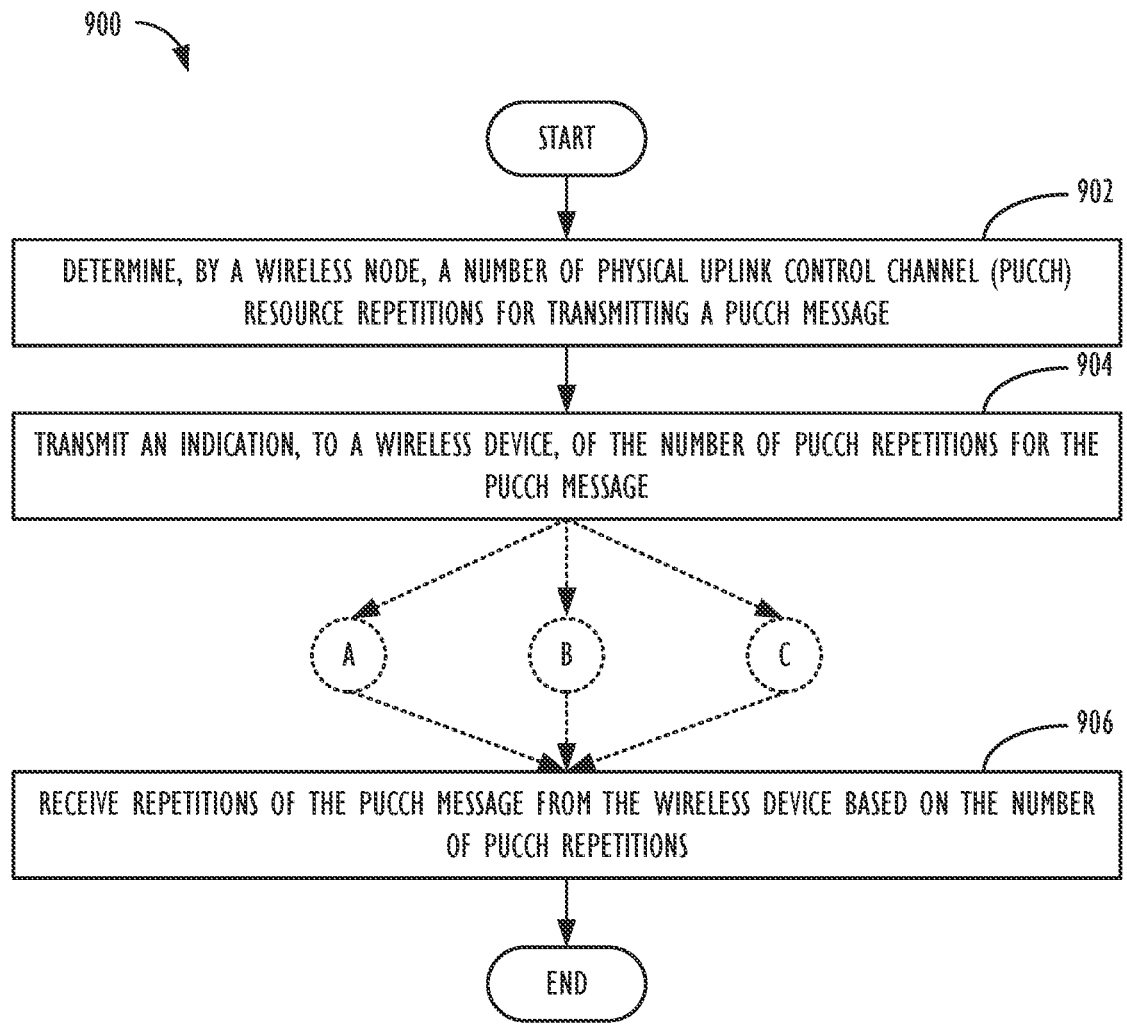
FIG. 9 is a flow diagram illustrating a technique for communications in a wireless system, in accordance with aspects of the present disclosure.

FIG. 9 is a flow diagram 900 illustrating a technique for communications in a wireless system, in accordance with aspects of the present disclosure. At block 902, a wireless node may determine a number of physical uplink control channel (PUCCH) resource repetitions for transmitting a PUCCH message. For example, the wireless node may determine to dynamically indicate a number of PUCCH repetitions for a PUCCH message and determine how many times the PUCCH message should be repeated by the wireless device. At block 904, the wireless node may transmit an indication, to a wireless device, of the number of PUCCH repetitions for a PUCCH message. As discussed below, this indication may be transmitted to the wireless device in various ways, which will be described in greater detail below, with reference to FIGS. 10, 11, and 12. At block 906, the wireless node may receive repetitions of the PUCCH message from the wireless device based on the number of PUCCH repetitions.

Figure 10:
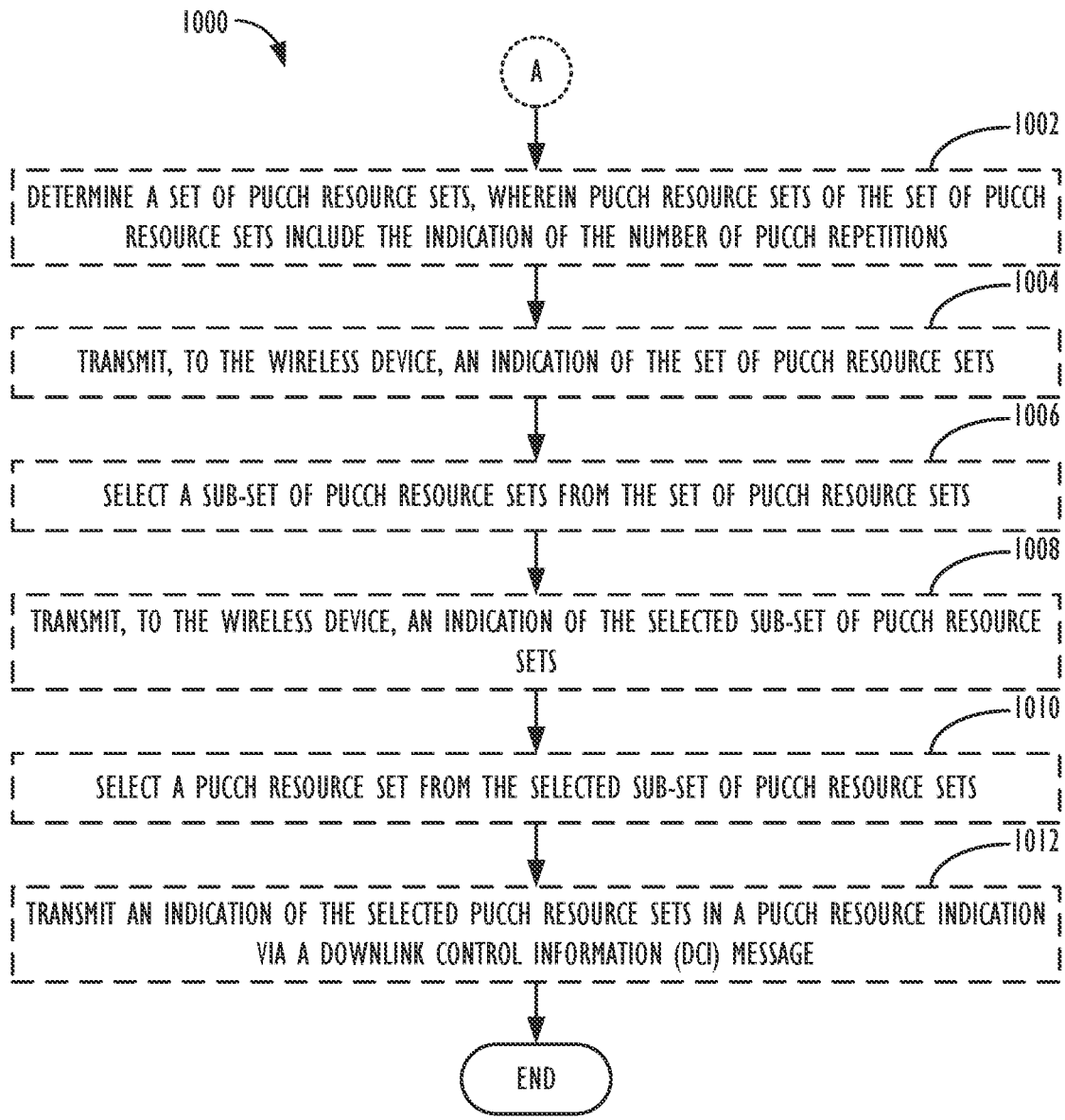
FIG. 10 is a flow diagram illustrating optional techniques for communications in a wireless system, in accordance with aspects of the present disclosure.

FIG. 10 is a flow diagram 1000 illustrating optional techniques for communications in a wireless system, in accordance with aspects of the present disclosure. Flow diagram 1000 extends the flow diagram 900 of FIG. 9 after block 904 and illustrates optional aspects of the present disclosure. At block 1002 the wireless node determines a set of PUCCH resource sets, wherein PUCCH resource sets of the set of PUCCH resource sets include the indication of the number of PUCCH repetitions. For example, the wireless node may determine the set of PUCCH resource sets that are configurable as between the wireless node and the wireless device. PUCCH resource sets of the set of PUCCH resources sets may include the indication of the number of PUCCH repetitions. At block 1004, the wireless node transmits, to the wireless device, an indication of the set of PUCCH resource set. In some cases, the set of PUCCH resource sets may be transmitted via radio resource control (RRC) signaling. At block 1006, the wireless node selects a sub-set of PUCCH resource sets from the set of PUCCH resource sets. For example, the wireless node may indicate to the wireless device a sub-set of PUCCH resource sets, from the multiple sets of PUCCH resources for use. This selection may be based, for example, on measurements of the wireless channel as between the wireless node and wireless device. At block 1008, the wireless node transmits, to the wireless device, an indication of the selected sub-set of PUCCH resource sets. In some cases, the indication of the selected PUCCH resource set may be transmitted via a medium access control (MAC) control element (MAC-CE). At block 1010, a PUCCH resource set from the selected sub-set of PUCCH resource sets may be selected. For example, the wireless node may select a specific PUCCH resource set, including a number of PUCCH repetitions, for the PUCCH message. At block 1012, the wireless node may transmit an indication of the selected PUCCH resource set in a PUCCH Resource Indication via a downlink control information (DCI) message.

Figure 11:
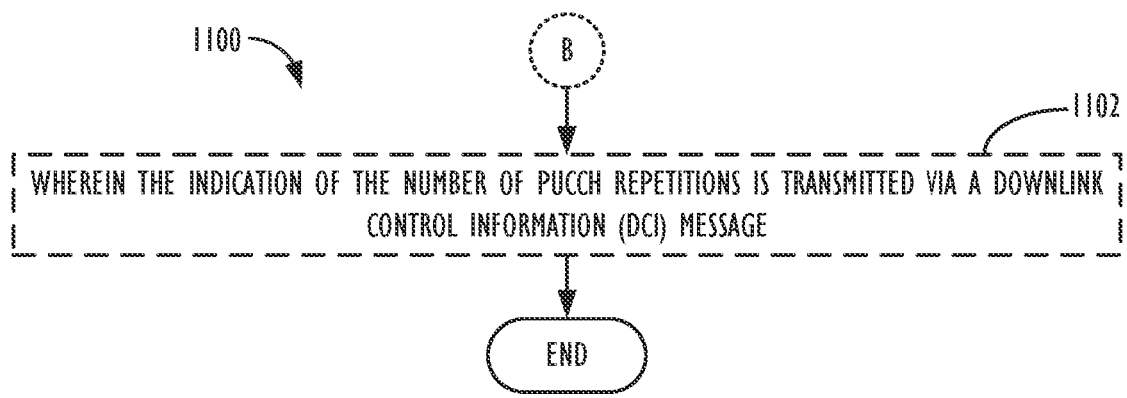
FIG. 11 is a flow diagram illustrating optional techniques for communications in a wireless system, in accordance with aspects of the present disclosure.

FIG. 11 is a flow diagram 1100 illustrating optional techniques for communications in a wireless system, in accordance with aspects of the present disclosure. Flow diagram 1100 extends the flow diagram 900 of FIG. 9 after block 904 and illustrates optional aspects of the present disclosure. At block 1102, The indication of the number of PUCCH repetitions is transmitted via a downlink control information (DCI) message. For example, an indication of a PUCCH resources set, including the indication of the number of repetitions, for a PUCCH message may be sent via DCI to a wireless device.

Figure 12:
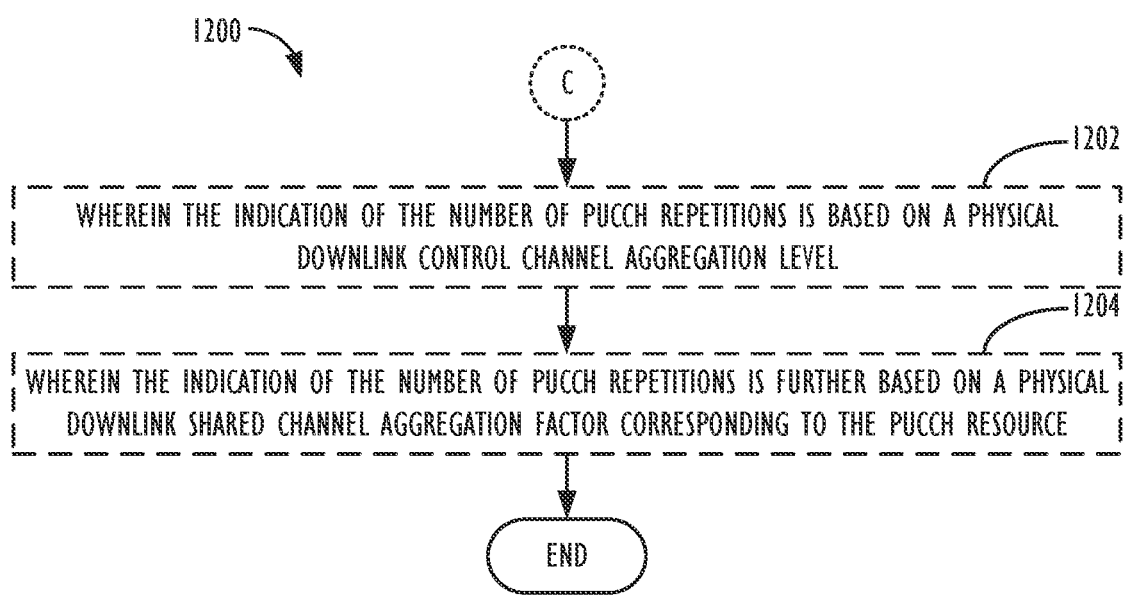
FIG. 12 is a flow diagram illustrating optional techniques for communications in a wireless system, in accordance with aspects of the present disclosure.

FIG. 12 is a flow diagram 1200 illustrating optional techniques for communications in a wireless system, in accordance with aspects of the present disclosure. Flow diagram 1200 extends the flow diagram 900 of FIG. 9 after block 904 and illustrates optional aspects of the present disclosure. At block 1202, the indication of the number of PUCCH repetitions is based on a physical downlink control channel aggregation level. For example, the indication of the number of PUCCH repetitions may be transmitted implicitly, such as based on a PDCCH aggregation level. At block 1204, the indication of the number of PUCCH repetitions is further based on a physical downlink shared channel aggregation factor corresponding to the PUCCH resource. In some cases, the indication of the number of PUCCH repetitions may be implicitly indicated based on PDCCH aggregation level and PDSCH aggregation factor.

Figure 13:
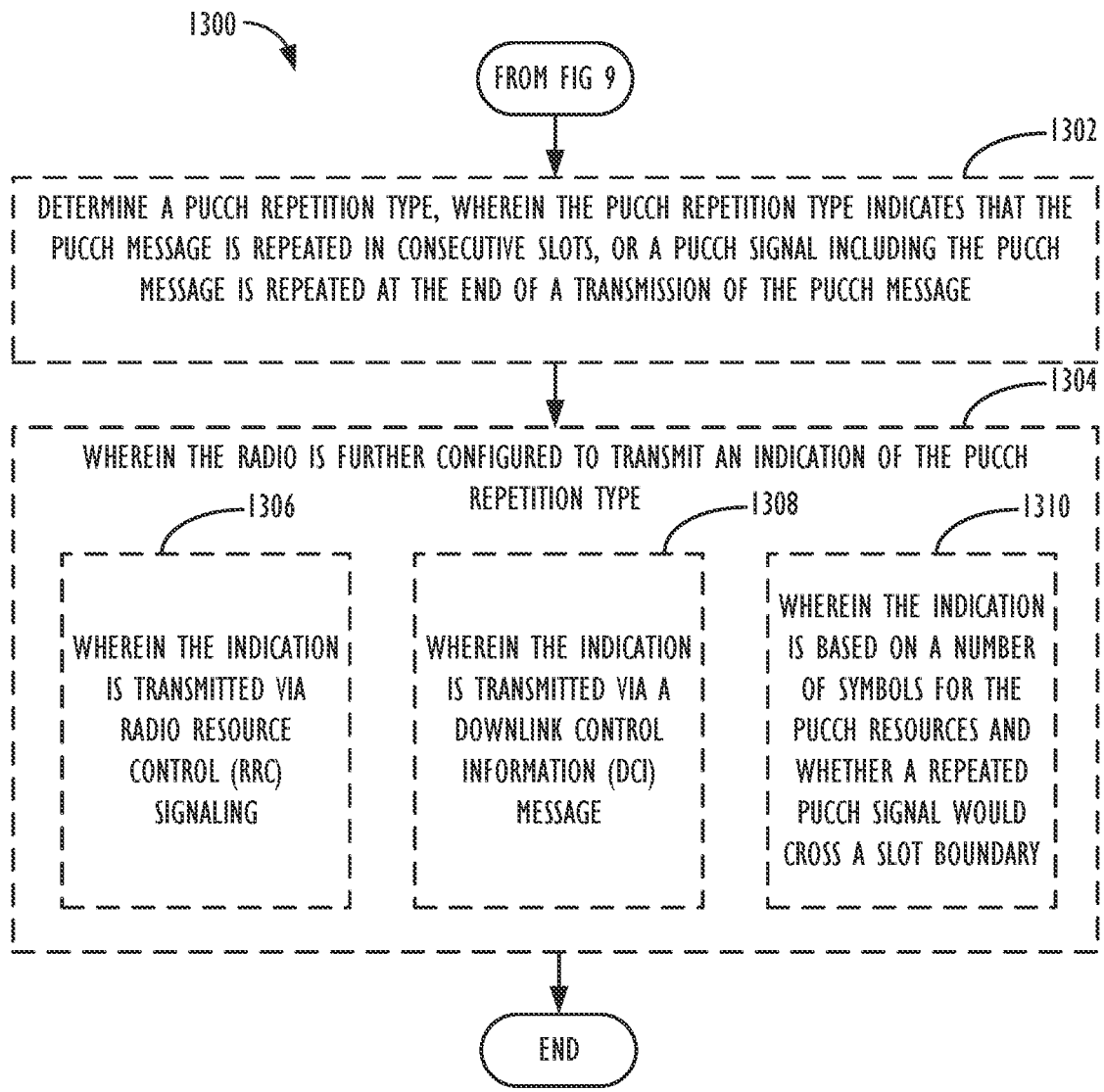
FIG. 13 is a flow diagram illustrating optional techniques for communications in a wireless system, in accordance with aspects of the present disclosure.

FIG. 13 is a flow diagram 1300 illustrating optional techniques for communications in a wireless system, in accordance with aspects of the present disclosure. Flow diagram 1300 extends the flow diagram 900 of FIG. 9 and illustrates optional aspects of the present disclosure. At block 1302, the wireless node may determine a PUCCH repetition type, wherein the PUCCH repetition type indicates that: the PUCCH message is repeated in consecutive slots, or a PUCCH signal including the PUCCH message is repeated at the end of a transmission of the PUCCH message. For example, the wireless node may determine whether PUCCH repetitions should be performed in consecutive slots (e.g., slot based) or performed back-to-back in a single slot. At block 1304, the wireless node transmits an indication of the PUCCH repetition type. Blocks 1306, 1308, and 1310 illustrate optional techniques for transmitting the indication of the PUCCH repetition type. At block 1306, the indication of the PUCCH repetition type is transmitted via radio resource control (RRC) signaling. At block 1308, the indication of the PUCCH repetition type is transmitted via a downlink control information (DCI) message. At block 1310, the indication of the PUCCH repetition type is based on a number of symbols for the PUCCH resources and whether a repeated PUCCH signal would cross a slot boundary. For example, the indication of the PUCCH repetition type may be implicitly signaled as being slot based if back-to-back repetition would cross a slot boundary.

Figure 14:
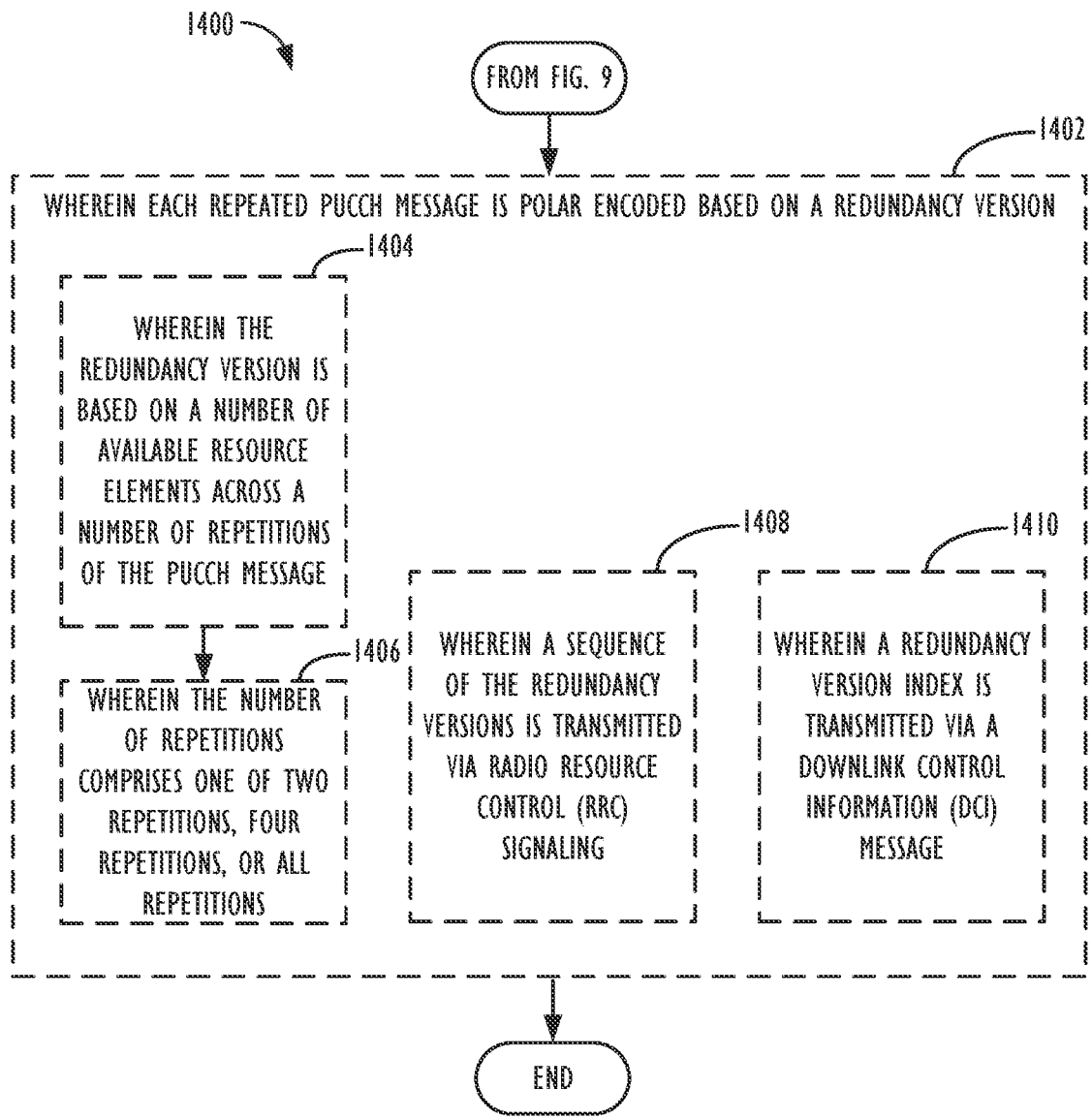
FIG. 14 is a flow diagram illustrating optional techniques for communications in a wireless system, in accordance with aspects of the present disclosure.

FIG. 14 is a flow diagram 1400 illustrating optional techniques for communications in a wireless system, in accordance with aspects of the present disclosure. Flow diagram 1400 extends the flow diagram 900 of FIG. 9 and illustrates optional aspects of the present disclosure. At block 1402, each repeated PUCCH message is polar encoded based on a redundancy version. Blocks 1404, 1406, 1408, and 1410 illustrate optional techniques for the redundancy version. At block 1404, the redundancy version is based on a number of available resource elements across a number of repetitions of the PUCCH message. At block 1406, the number of repetitions comprises one of two repetitions, four repetitions, or all repetitions. At block 1408, a sequence of the redundancy versions is transmitted via radio resource control (RRC) signaling. At block 1410, a redundancy version index is transmitted via a downlink control information (DCI) message.

Figure 15:
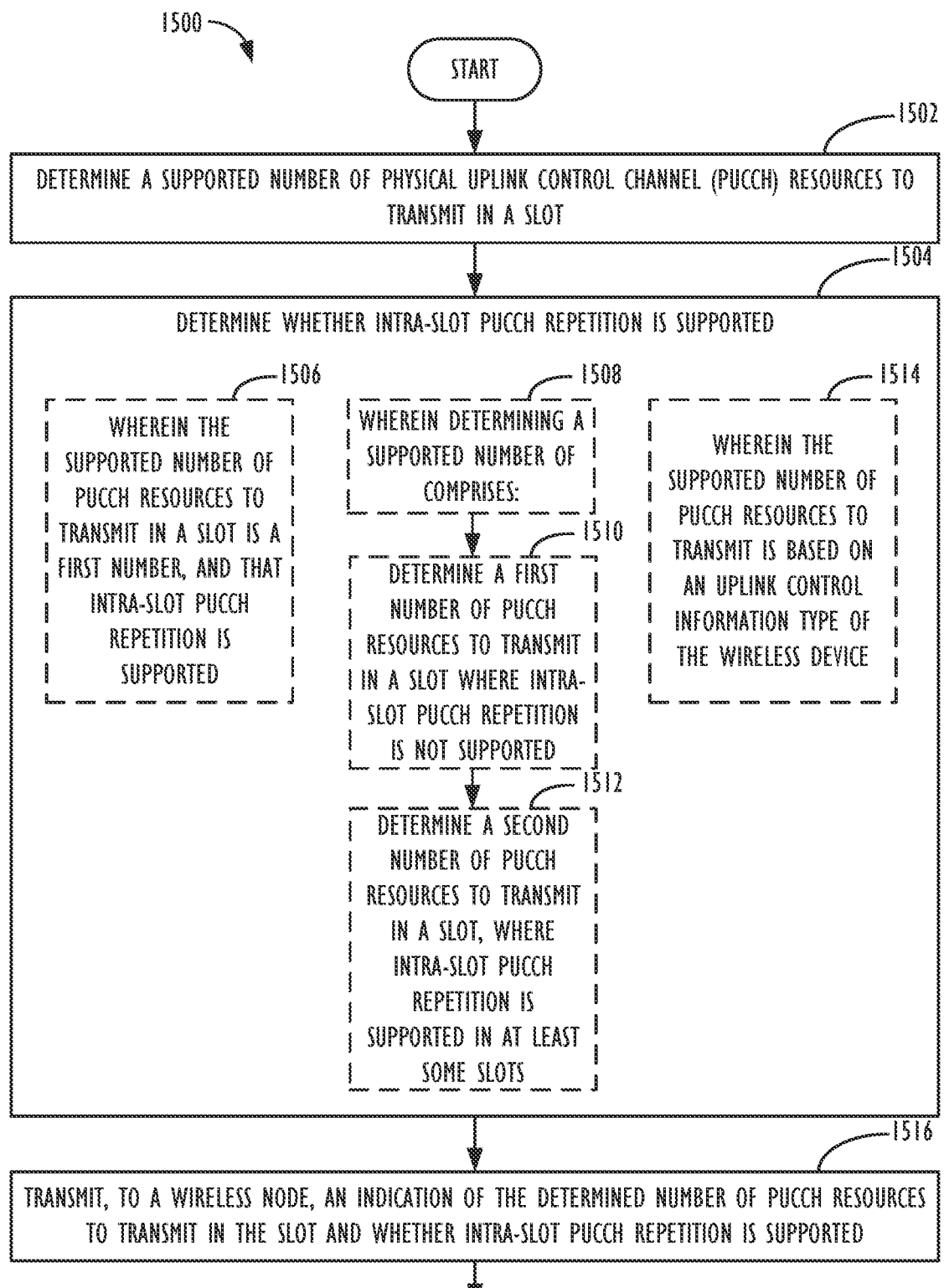
FIG. 15 is a flow diagram illustrating techniques for communications in a wireless system, in accordance with aspects of the present disclosure.

FIG. 15 is a flow diagram 1500 illustrating techniques for communications in a wireless system, in accordance with aspects of the present disclosure. At block 1502, a wireless device may determine a supported number of physical uplink control channel (PUCCH) resources to transmit in a slot. At block 1504, the wireless node may determine whether intra-slot PUCCH repetition is supported. Blocks 1506, 1508, 1510, 1512, and 1514 illustrate optional aspects for the supported number of PUCCH resources to transmit in a slot. At block 1506, the supported number of PUCCH resources to transmit in a slot is a first number, and that intra-slot PUCCH repetition is supported. At block 1508, determining a supported number of PUCCH resources to transmit in a slot may comprise certain steps. At block 1510, the wireless device may determine a first number of PUCCH resources to transmit in a slot where intra-slot PUCCH repetition is not supported. At block 1512, the wireless device may determine a second number of PUCCH resources to transmit in a slot, where intra-slot PUCCH repetition is supported in at least some slots. At block 1514, the supported number of PUCCH resources to transmit is based on an uplink control information type of the wireless device. At block 1516, the wireless device transmits, to a wireless node, an indication of the determined number of PUCCH resources to transmit in the slot and whether intra-slot PUCCH repetition is supported.

Figure 16:
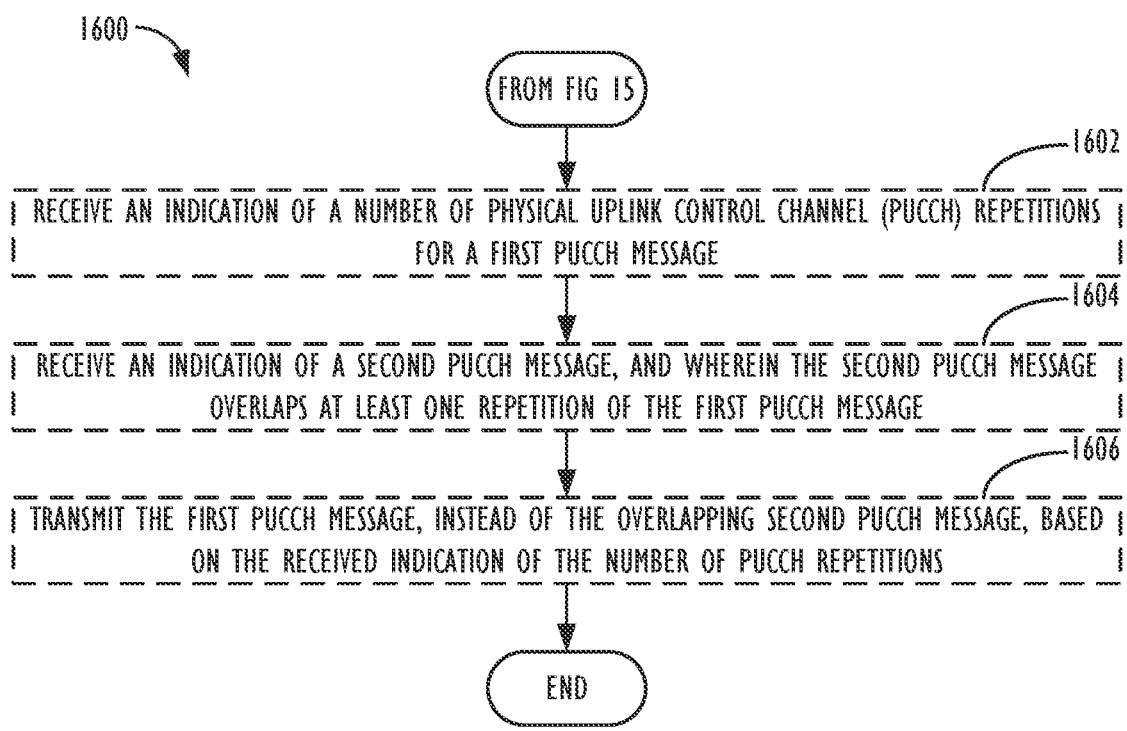
FIG. 16 is a flow diagram illustrating optional techniques for communications in a wireless system, in accordance with aspects of the present disclosure.

FIG. 16 is a flow diagram 1600 illustrating optional techniques for communications in a wireless system, in accordance with aspects of the present disclosure. Flow diagram 1600 extends the flow diagram 1500 of FIG. 15 and illustrates optional aspects of the present disclosure. At block 1602, the wireless device receives an indication of a number of physical uplink control channel (PUCCH) repetitions for a first PUCCH message. At block 1604, the wireless device receives an indication of a second PUCCH message, and wherein the second PUCCH message overlaps at least one repetition of the first PUCCH message. In some cases, an indication of a number of PUCCH repetitions specific to the second PUCCH message is not received. For example, if the second PUCCH message (including repetitions) is scheduled to be transmitted in any slot that the first PUCCH message is also scheduled to be transmitted in, the first PUCCH and second PUCCH overlap. At block 1606, the wireless device transmits the first PUCCH message, instead of the overlapping second PUCCH message, based on the received indication of the number of PUCCH repetitions.

Figure 17:
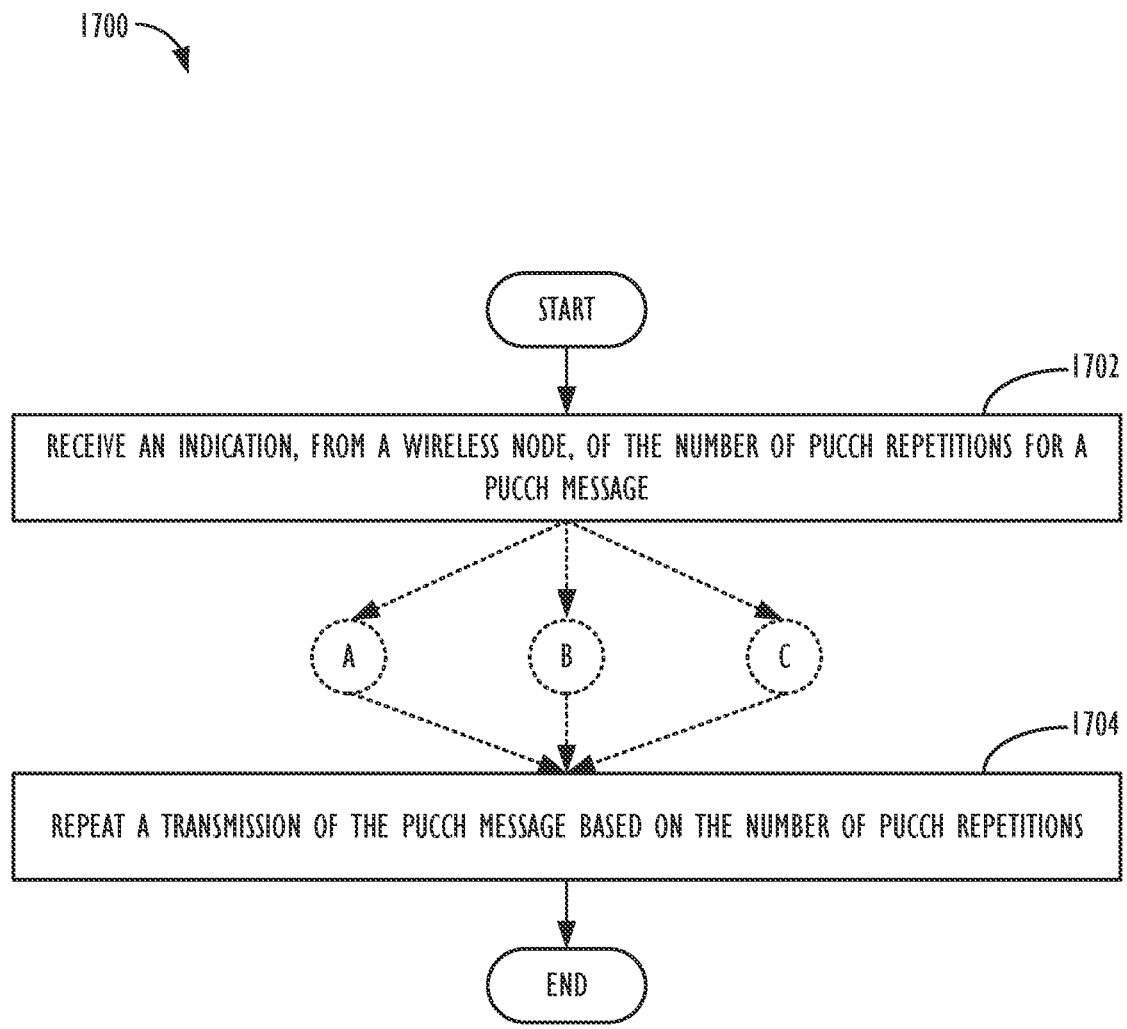
FIG. 17 is a flow diagram illustrating techniques for communications in a wireless system, in accordance with aspects of the present disclosure.

FIG. 17 is a flow diagram 1700 illustrating techniques for communications in a wireless system, in accordance with aspects of the present disclosure. At block 1702, a wireless device may receive an indication, from a wireless node, of the number of PUCCH repetitions for a PUCCH message. As discussed in greater detail below with reference to FIGS. 18, 19, and 20, this indication may be received by the wireless device in various ways. At block 1704, the wireless device may repeat a transmission of the PUCCH message based on the number of PUCCH repetitions.

Figure 18:
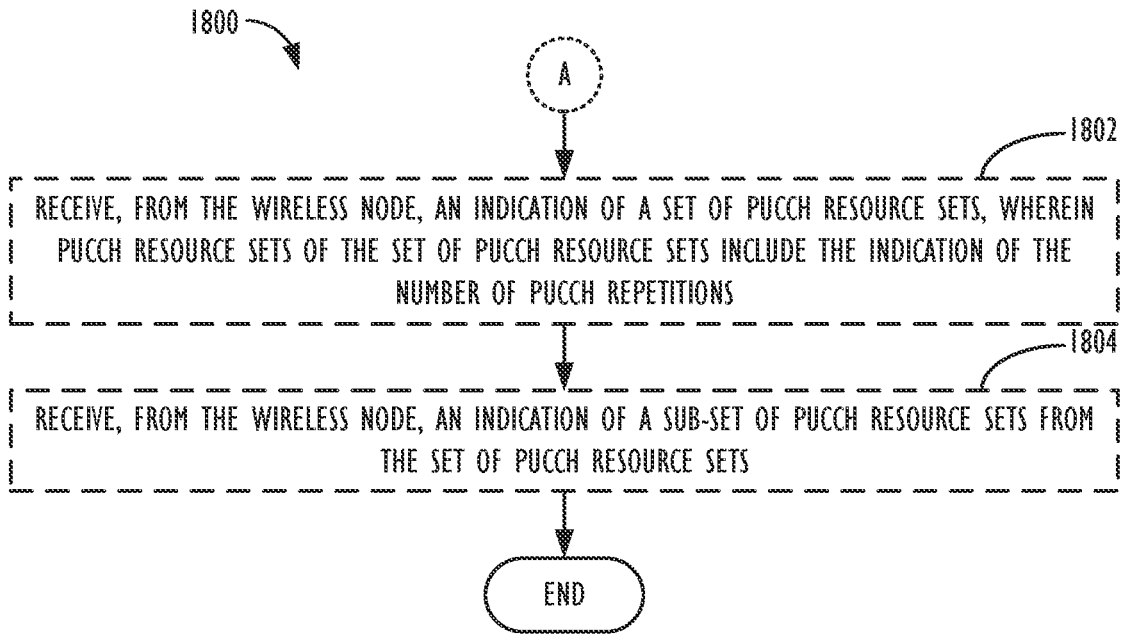
FIG. 18 is a flow diagram illustrating optional techniques for communications in a wireless system, in accordance with aspects of the present disclosure.

FIG. 18 is a flow diagram 1800 illustrating optional techniques for communications in a wireless system, in accordance with aspects of the present disclosure. Flow diagram 1800 extends the flow diagram 1700 of FIG. 17 and illustrates optional aspects of the present disclosure. At block 1802, the wireless device receives, from the wireless node, an indication of a set of PUCCH resource sets, wherein PUCCH resource sets of the set of PUCCH resource sets include the indication of the number of PUCCH repetitions. At block 1804, the wireless device receives, from the wireless node, an indication of a sub-set of PUCCH resource sets from the set of PUCCH resource sets.

Figure 19:
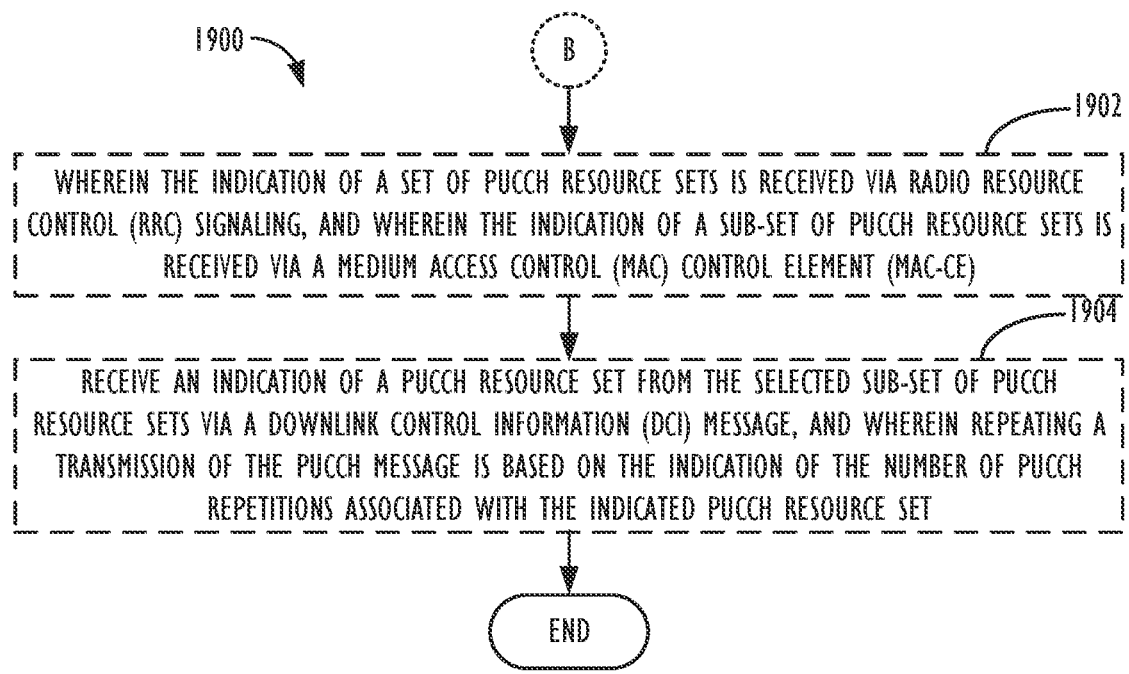
FIG. 19 is a flow diagram illustrating optional techniques for communications in a wireless system, in accordance with aspects of the present disclosure.

FIG. 19 is a flow diagram 1900 illustrating optional techniques for communications in a wireless system, in accordance with aspects of the present disclosure. Flow diagram 1900 extends the flow diagram 1700 of FIG. 17 and illustrates optional aspects of the present disclosure. At block 1902, the indication of a set of PUCCH resource sets is received via radio resource control (RRC) signaling, and wherein the indication of a sub-set of PUCCH resource sets is received via a medium access control (MAC) control element (MAC-CE). Optionally, at block 1904, the wireless device receives an indication of a PUCCH resource set from the selected sub-set of PUCCH resource sets via a downlink control information (DCI) message, and wherein repeating a transmission of the PUCCH message is based on the indication of the number of PUCCH repetitions associated with the indicated PUCCH resource set.

Figure 20:
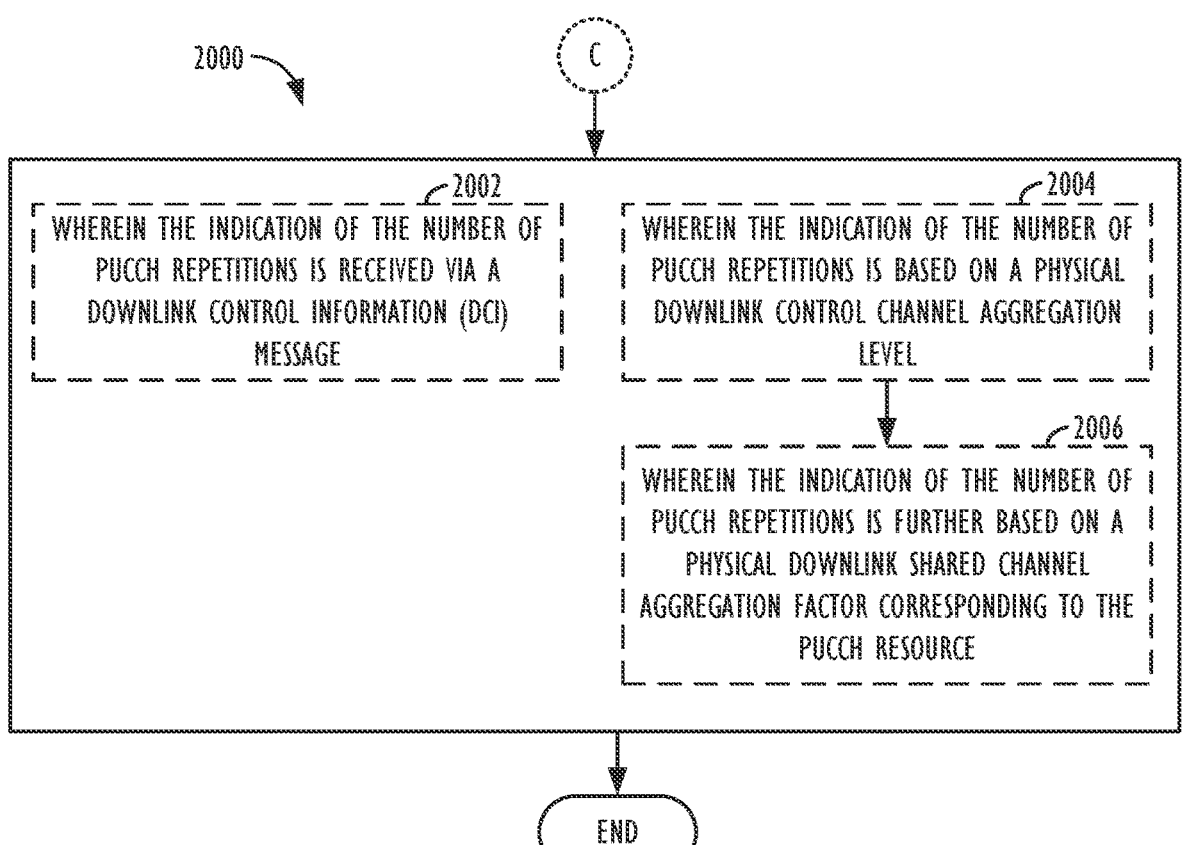
FIG. 20 is a flow diagram illustrating optional techniques for communications in a wireless system, in accordance with aspects of the present disclosure.

FIG. 20 is a flow diagram 2000 illustrating optional techniques for communications in a wireless system, in accordance with aspects of the present disclosure. Flow diagram 2000 extends the flow diagram 1700 of FIG. 17 and illustrates optional aspects of the present disclosure. At block 2002, the indication of the number of PUCCH repetitions is received via a downlink control information (DCI) message. Optionally, at block 2004, the indication of the number of PUCCH repetitions is based on a physical downlink control channel aggregation level. At block 2006, the indication of the number of PUCCH repetitions is further based on a physical downlink shared channel aggregation factor corresponding to the PUCCH resource.

Figure 21:
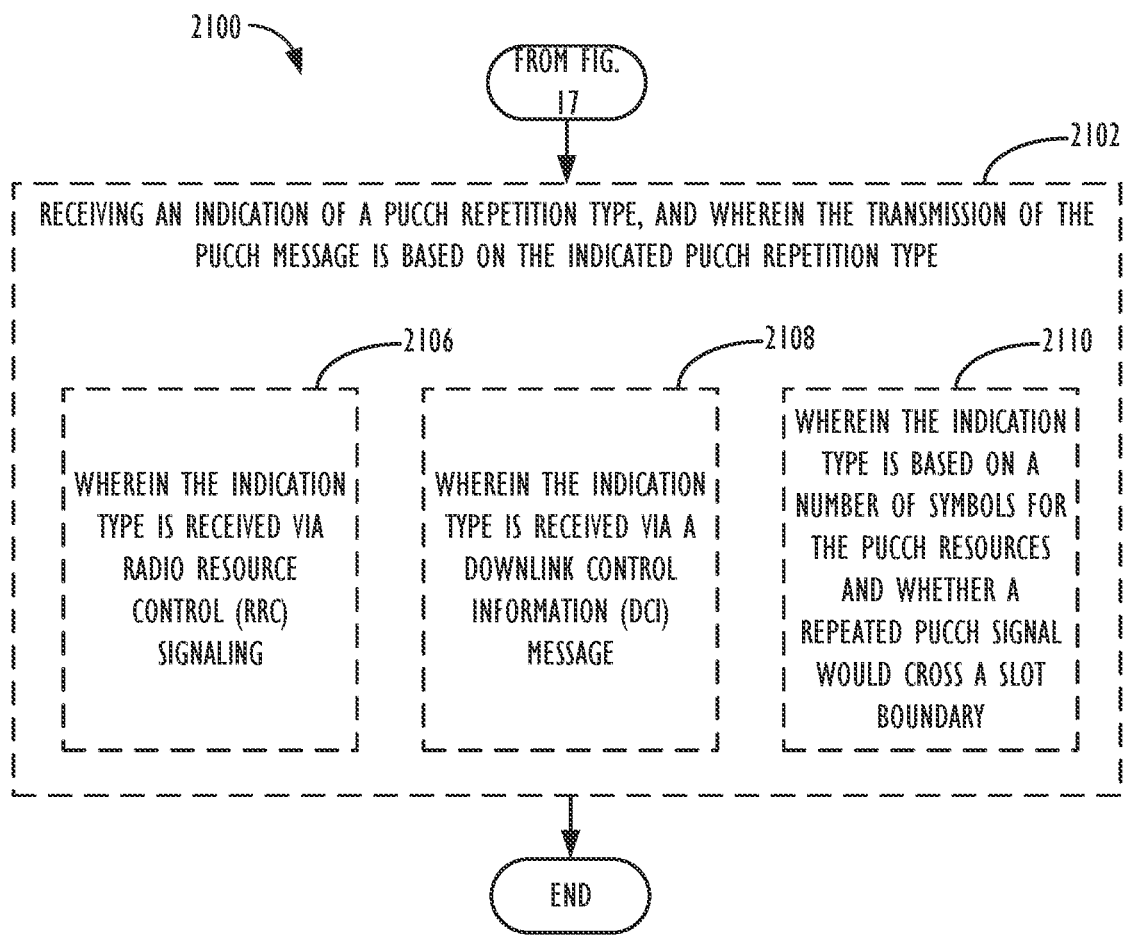
FIG. 21 is a flow diagram illustrating optional techniques for communications in a wireless system, in accordance with aspects of the present disclosure.

FIG. 21 is a flow diagram 2100 illustrating optional techniques for communications in a wireless system, in accordance with aspects of the present disclosure. Flow diagram 2100 extends the flow diagram 1700 of FIG. 17 and illustrates optional aspects of the present disclosure. At block 2102, the wireless device may receive an indication of a PUCCH repetition type, and wherein the transmission of the PUCCH message is based on the indicated PUCCH repetition type. Optionally, at block 2106, the indication type is received via radio resource control (RRC) signaling.

Optionally, at block 2108, the indication type is received via a downlink control information (DCI) message. Optionally, at block 2110, the indication type is based on a number of symbols for the PUCCH resources and whether a repeated PUCCH signal would cross a slot boundary.

Figure 22:
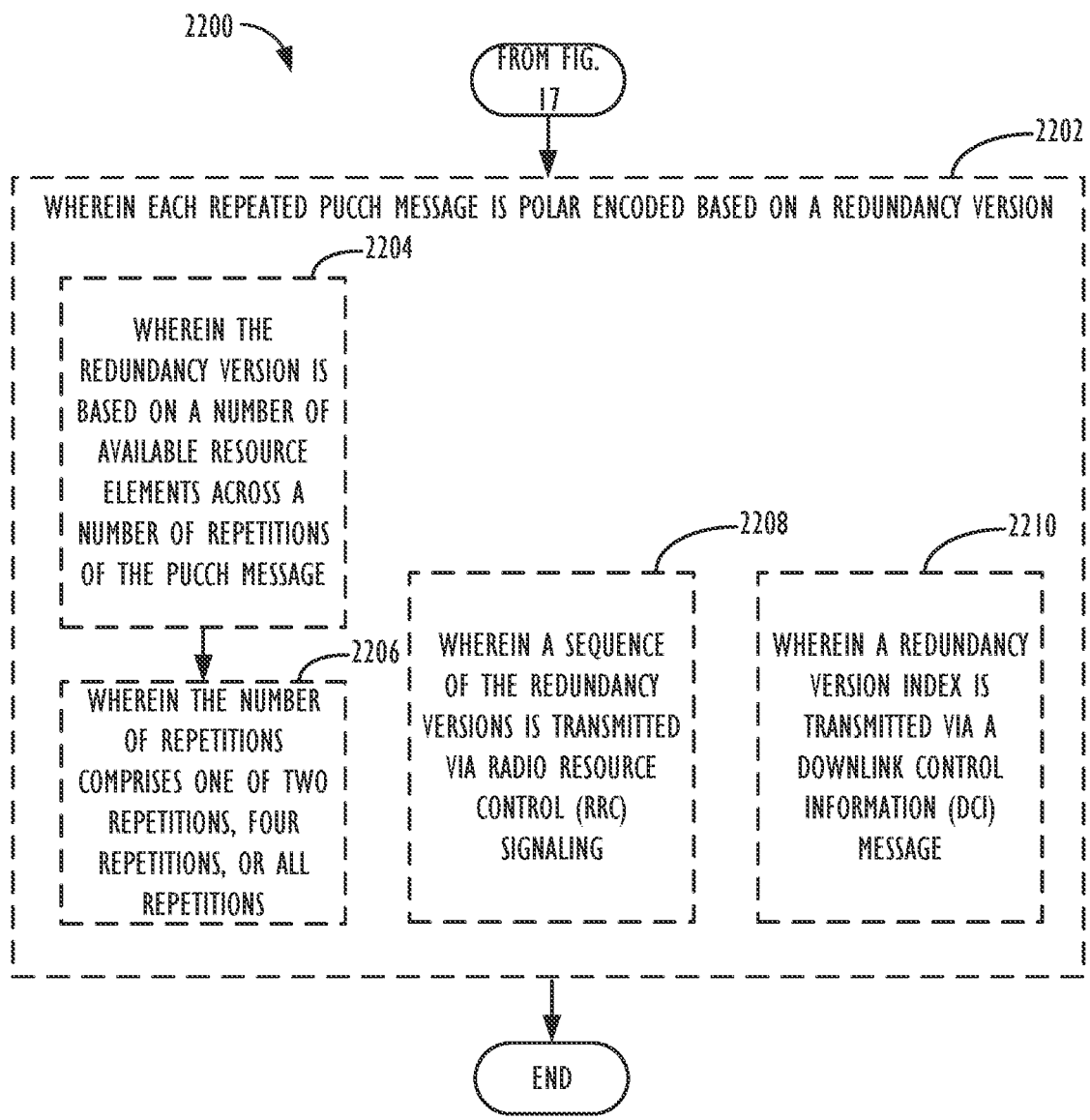
FIG. 22 is a flow diagram illustrating optional techniques for communications in a wireless system, in accordance with aspects of the present disclosure.

FIG. 22 is a flow diagram 2200 illustrating optional techniques for communications in a wireless system, in accordance with aspects of the present disclosure. Flow diagram 2200 extends the flow diagram 1700 of FIG. 17 and illustrates optional aspects of the present disclosure. At block 2202, each repeated PUCCH message is polar encoded based on a redundancy version. Optionally, at block 2204, the redundancy version is based on a number of available resource elements across a number of repetitions of the PUCCH message. At block 2206, the number of repetitions comprises one of two repetitions, four repetitions, or all repetitions. Optionally, at block 2208, a sequence of the redundancy versions is received via radio resource control (RRC) signaling. For example, a starting redundancy version index may be sent via DCI for the first PUCCH repetition and each further repetition can use a next redundancy index based on a pattern. Optionally, at block 2210, the redundancy version index is received via a downlink control information (DCI) message.

EXAMPLES

In the following sections, further exemplary aspects are provided.

According to Example 1, A wireless node comprising: a radio; and a processor operably coupled to the radio, wherein the processor is configured to: determine a number of physical uplink control channel (PUCCH) resource repetitions for transmitting a PUCCH message; and wherein the radio is configured to: transmit an indication, to a wireless device, of the number of PUCCH repetitions for a PUCCH message; and receive repetitions of the PUCCH message from the wireless device based on the number of PUCCH repetitions.

Example 2 comprises the subject matter of Example 1, wherein the processor is further configured to: determine a set of PUCCH resource sets, wherein PUCCH resource sets of the set of PUCCH resource sets include the indication of the number of PUCCH repetitions; and select a sub-set of PUCCH resource sets from the set of PUCCH resource sets; and wherein the radio is further configured to: transmit, to the wireless device, an indication of the set of PUCCH resource set; and transmit, to the wireless device, an indication of the selected sub-set of PUCCH resource sets.

Example 3 comprises the subject matter of Example 2, wherein the radio is further configured to: transmit the set of PUCCH resource sets via radio resource control (RRC) signaling; and transmit the indication of the selected PUCCH resource set via a medium access control (MAC) control element (MAC-CE).

Example 4 comprises the subject matter of Example 3, wherein the processor is further configured to select a PUCCH resource set from the selected sub-set of PUCCH resource sets; and wherein the radio is further configured to transmit an indication of the selected PUCCH resource set in a PUCCH Resource Indication via a downlink control information (DCI) message.

Example 5 comprises the subject matter of Example 1, wherein the indication of the number of PUCCH repetitions is transmitted via a downlink control information (DCI) message.

Example 6 comprises the subject matter of Example 1, wherein the indication of the number of PUCCH repetitions is based on a physical downlink control channel aggregation level.

Example 7 comprises the subject matter of Example 6, wherein the indication of the number of PUCCH repetitions is further based on a physical downlink shared channel aggregation factor corresponding to the PUCCH resource.

Example 8 comprises the subject matter of Example 1, wherein the processor is further configured to: determine a PUCCH repetition type, wherein the PUCCH repetition type indicates that; the PUCCH message is repeated in consecutive slots, or a PUCCH signal including the PUCCH message is repeated at the end of a transmission of the PUCCH message; and wherein the radio is further configured to transmit an indication of the PUCCH repetition type.

Example 9 comprises the subject matter of Example 8, wherein the indication of the PUCCH repetition type is transmitted via radio resource control (RRC) signaling.

Example 10 comprises the subject matter of Example 8, wherein the indication of the PUCCH repetition type is transmitted via a downlink control information (DCI) message.

Example 11 comprises the subject matter of Example 8, wherein the indication of the PUCCH repetition type is based on a number of symbols for the PUCCH resources and whether a repeated PUCCH signal would cross a slot boundary.

Example 12 comprises the subject matter of Example 1, wherein each repeated PUCCH message is polar encoded based on a redundancy version.

Example 13 comprises the subject matter of Example 12, wherein the redundancy version is based on a number of available resource elements across a number of repetitions of the PUCCH message.

Example 14 comprises the subject matter of Example 13, wherein the number of repetitions comprises one of two repetitions, four repetitions, or all repetitions.

Example 15 comprises the subject matter of Example 12, wherein a sequence of the redundancy versions is transmitted via radio resource control (RRC) signaling.

Example 16 comprises the subject matter of Example 12, wherein a redundancy version index is transmitted via a downlink control information (DCI) message.

According to Example 17 a method for wireless networking, the method comprising: determining a supported number of physical uplink control channel (PUCCH) resources to transmit in a slot; determining whether intra-slot PUCCH repetition is supported; transmitting, to a wireless node, an indication of the determined number of PUCCH resources to transmit in the slot and whether intra-slot PUCCH repetition is supported.

Example 18 comprises the subject matter of Example 17, wherein the supported number of PUCCH resources to transmit in a slot is a first number, and that intra-slot PUCCH repetition is supported.

Example 18 comprises the subject matter of Example 17, wherein the determining a supported number of comprises: determining a first number of PUCCH resources to transmit in a slot where intra-slot PUCCH repetition is not supported; and determining a second number of PUCCH resources to transmit in a slot, where intra-slot PUCCH repetition is supported in at least some slots.

Example 20 comprises the subject matter of Example 17, wherein the supported number is based on an uplink control information type of the wireless device.

Example 21 comprises the subject matter of Example 17, further comprising: receiving an indication of a number of physical uplink control channel (PUCCH) repetitions for a first PUCCH message; receiving an indication of a second PUCCH message, and wherein the second PUCCH message overlaps at least one repetition of the first PUCCH message; transmitting the first PUCCH message, instead of the overlapping second PUCCH message, based on the received indication of the number of PUCCH repetitions.

Example 22 comprises the subject matter of Example 21, wherein an indication of a number of PUCCH repetitions specific to the second PUCCH message is not received.

Example 23 comprises the subject matter of Example 1, further comprising: determining an aggregation level of a physical downlink control channel (PDCCH) for transmitting a PDCCH message scheduling a physical uplink shared channel (PUSCH) message; transmitting the PDCCH message based on the aggregation level; and receiving repetitions of a PUSCH message from the wireless device, wherein a number of repetitions of the PUSCH is based on the aggregation level of the PDCCH.

According to Example 24, a method for wireless networking by a wireless device, the method comprising: receiving an indication, from a wireless node, of the number of PUCCH repetitions for a PUCCH message; and repeating a transmission of the PUCCH message based on the number of PUCCH repetitions.

Example 25 comprises the subject matter of Example 24, further comprising: receiving, from the wireless node, an indication of a set of PUCCH resource sets, wherein PUCCH resource sets of the set of PUCCH resource sets include the indication of the number of PUCCH repetitions; and receiving, from the wireless node, an indication of a sub-set of PUCCH resource sets from the set of PUCCH resource sets.

Example 26 comprises the subject matter of Example 24, wherein the indication of a set of PUCCH resource sets is received via radio resource control (RRC) signaling, and wherein the indication of a sub-set of PUCCH resource sets is received via a medium access control (MAC) control element (MAC-CE).

Example 27 comprises the subject matter of Example 26, further comprising receiving an indication of a PUCCH resource set from the selected sub-set of PUCCH resource sets via a downlink control information (DCI) message, and wherein repeating a transmission of the PUCCH message is based on the indication of the number of PUCCH repetitions associated with the indicated PUCCH resource set.

Example 28 comprises the subject matter of Example 24, wherein the indication of the number of PUCCH repetitions is received via a downlink control information (DCI) message.

Example 29 comprises the subject matter of Example 24, wherein the indication of the number of PUCCH repetitions is based on a physical downlink control channel aggregation level.

Example 30 comprises the subject matter of Example 29, wherein the indication of the number of PUCCH repetitions is further based on a physical downlink shared channel aggregation factor corresponding to the PUCCH resource.

Example 31 comprises the subject matter of Example 24, further comprising: receiving an indication of a PUCCH repetition type, and wherein the transmission of the PUCCH message is based on the indicated PUCCH repetition type.

Example 32 comprises the subject matter of Example 31, wherein the indication of the PUCCH repetition type is received via radio resource control (RRC) signaling.

Example 33 comprises the subject matter of Example 31, wherein the indication of the PUCCH repetition type is received via a downlink control information (DCI) message.

Example 34 comprises the subject matter of Example 31, wherein the indication of the PUCCH repetition type is based on a number of symbols for the PUCCH resources and whether a repeated PUCCH signal would cross a slot boundary.

Example 35 comprises the subject matter of Example 24, wherein each repeated PUCCH message is polar encoded based on a redundancy version.

Example 36 comprises the subject matter of Example 35, wherein the redundancy version is based on a number of available resource elements across a number of repetitions of the PUCCH message.

Example 37 comprises the subject matter of Example 36, wherein the number of repetitions comprises one of two repetitions, four repetitions, or all repetitions.

Example 38 comprises the subject matter of Example 35, wherein a sequence of the redundancy versions is received via radio resource control (RRC) signaling.

Example 39 comprises the subject matter of Example 35, wherein a redundancy version index is received via a downlink control information (DCI) message.

Example 40 comprises the subject matter of Example 24, further comprising: receiving a physical downlink control channel (PDCCH) message, the PDCCH message associated with an aggregation level and the PDCCH message scheduling a physical uplink shared channel (PUSCH) message; determining a number of repetitions of the PUSCH message based on the aggregation level of the PDCCH message; and repeating a transmission of the PDCCH message based on the aggregation level of the PDCCH.

According to Example 41, a method that includes any action or combination of actions as substantially described herein in the Detailed Description.

According to Example 42, a method as substantially described herein with reference to each or any combination of the Figures included herein or with reference to each or any combination of paragraphs in the Detailed Description.

According to Example 43, a wireless device configured to perform any action or combination of actions as substantially described herein in the Detailed Description as included in the wireless device.

According to Example 44, a wireless station configured to perform any action or combination of actions as substantially described herein in the Detailed Description as included in the wireless station.

According to Example 45, a non-volatile computer-readable medium that stores instructions that, when executed, cause the performance of any action or combination of actions as substantially described herein in the Detailed Description.

According to Example 46, an integrated circuit configured to perform any action or combination of actions as substantially described herein in the Detailed Description.

Yet another exemplary aspect may include a method, comprising, by a device, performing any or all parts of the preceding Examples.

A yet further exemplary aspect may include a non-transitory computer-accessible memory medium comprising program instructions which, when executed at a device, cause the device to implement any or all parts of any of the preceding Examples.

A still further exemplary aspect may include a computer program comprising instructions for performing any or all parts of any of the preceding Examples.

Yet another exemplary aspect may include an apparatus comprising means for performing any or all of the elements of any of the preceding Examples.

Still another exemplary aspect may include an apparatus comprising a processor configured to cause a device to perform any or all of the elements of any of the preceding Examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Aspects of the present disclosure may be realized in any of various forms. For example, some aspects may be realized as a computer-implemented method, a computer-readable memory medium, or a computer system. Other aspects may be realized using one or more custom-designed hardware devices such as ASICs. Still other aspects may be realized using one or more programmable hardware elements such as FPGAs.

In some aspects, a non-transitory computer-readable memory medium may be configured so that it stores program instructions and/or data, where the program instructions, if executed by a computer system, cause the computer system to perform a method, e.g., any of a method aspects described herein, or, any combination of the method aspects described herein, or, any subset of any of the method aspects described herein, or, any combination of such subsets.

In some aspects, a device (e.g., a UE 106, a BS 102, a network element 600) may be configured to include a processor (or a set of processors) and a memory medium, where the memory medium stores program instructions, where the processor is configured to read and execute the program instructions from the memory medium, where the program instructions are executable to implement any of the various method aspects described herein (or, any combination of the method aspects described herein, or, any subset of any of the method aspects described herein, or, any combination of such subsets). The device may be realized in any of various forms.

Although the aspects above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless node comprising:
a radio; and
a processor operably coupled to the radio, wherein the processor is configured to:
determine a number of physical uplink control channel (PUCCH) repetitions for transmitting a PUCCH message;
determine a set of PUCCH resources, wherein each PUCCH resource of the set of PUCCH resources is associated with a number of PUCCH repetitions;
select a sub-set of PUCCH resources from the set of PUCCH resources based, at least in part, on one or more measurements of wireless channel conditions for the set of PUCCH resources; and
select at least one PUCCH resource from the sub-set of PUCCH resources, wherein the radio is configured to:
transmit, to a wireless device, an indication of the number of PUCCH repetitions for a PUCCH message;
transmit, to the wireless device, an indication of the selected sub-set of PUCCH resources and the selected at least one PUCCH resource; and
receive repetitions of the PUCCH message from the wireless device, using the selected at least one PUCCH resource and based on the transmitted indication of the number of PUCCH repetitions.

2. The wireless node of claim 1, wherein the indication of the number of PUCCH repetitions is transmitted via a downlink control information (DCI) message.

3. The wireless node of claim 1, wherein the indication of the number of PUCCH repetitions is based on a physical downlink control channel aggregation level.

4. The wireless node of claim 1, wherein the processor is further configured to:
determine a PUCCH repetition type, wherein the PUCCH repetition type indicates that:
the PUCCH message is repeated in consecutive slots, or
a PUCCH signal including the PUCCH message is repeated at the end of a transmission of the PUCCH message; and
wherein the radio is further configured to transmit an indication of the PUCCH repetition type.

5. The wireless node of claim 4, wherein the indication of the PUCCH repetition type is transmitted via radio resource control (RRC) signaling.

6. The wireless node of claim 4, wherein the indication of the PUCCH repetition type is transmitted via a downlink control information (DCI) message.

7. A non-transitory program storage device comprising instructions stored thereon to cause one or more processors to:
determine a supported number of physical uplink control channel (PUCCH) resources to transmit in a slot;
determine whether intra-slot PUCCH repetition is supported;
transmit, to a wireless node, an indication of the determined number of PUCCH resources to transmit in the slot and whether intra-slot PUCCH repetition is supported;
receive, from the wireless node, an indication of a number of PUCCH repetitions to use for a first PUCCH message;
receive, from the wireless node, an indication of a selected sub-set of PUCCH resources from a determined set of PUCCH resources, wherein the sub-set of PUCCH resources is selected based, at least in part, on one or more measurements of wireless channel conditions for the determined set of PUCCH resources;
receive, from the wireless node, an indication of at least one selected PUCCH resource from the sub-set of PUCCH resources; and
transmit the first PUCCH message to the wireless node, using the at least one selected PUCCH resource and based on the indicated number of PUCCH repetitions.

8. The non-transitory program storage device of claim 7, wherein the supported number of PUCCH resources to transmit in a slot is a first number, and wherein the indication of whether intra-slot PUCCH repetition is supported comprises an indication that intra-slot PUCCH repetition is supported.

9. The non-transitory program storage device of claim 7, wherein the instructions to determine the supported number further cause the one or more processors to:
  determine a first number of PUCCH resources to transmit in a slot where intra-slot PUCCH repetition is not supported; and
  determine a second number of PUCCH resources to transmit in a slot, where intra-slot PUCCH repetition is supported in at least some slots.

10. The non-transitory program storage device of claim 7, wherein the instructions further cause the one or more processors to:
  receive, from the wireless node, an indication of a second PUCCH message, wherein the second PUCCH message overlaps at least one repetition of the first PUCCH message; and
  transmit the first PUCCH message to the wireless node rather than the overlapping second PUCCH message, based on the received indication of the number of PUCCH repetitions.

11. A method for wireless networking by a wireless device, the method comprising:
  receiving, from the wireless node, an indication of a set of PUCCH resources, wherein each of the PUCCH resources of the set of PUCCH resources is associated with a number of PUCCH repetitions;
  receiving, from the wireless node, an indication of a sub-set of PUCCH resources from the set of PUCCH resources, wherein the sub-set of PUCCH resources is selected based, at least in part, on one or more measurements of wireless channel conditions for the set of PUCCH resources;
  receiving, from the wireless node, an indication of at least one selected PUCCH resource from the sub-set of PUCCH resources;
  receiving an indication, from the wireless node, of a number of PUCCH repetitions for a PUCCH message; and
  repeating a transmission of the PUCCH message, using the at least one selected PUCCH resource and based on the indicated number of PUCCH repetitions.

12. The method of claim 11, wherein the indication of the set of PUCCH resources is received via radio resource control (RRC) signaling, and wherein the indication of the sub-set of PUCCH resources is received via a medium access control (MAC) control element (MAC-CE).

13. The method of claim 11, wherein the indication of the number of PUCCH repetitions is received via a downlink control information (DCI) message.

14. The method of claim 11, wherein the indication of the number of PUCCH repetitions is based on a physical downlink control channel aggregation level.

15. The method of claim 11, further comprising:
  receiving an indication of a PUCCH repetition type, and wherein the transmission of the PUCCH message is based on the indicated PUCCH repetition type.

16. The method of claim 15, wherein the indication of the PUCCH repetition type is received via radio resource control (RRC) signaling.

17. The method of claim 15, wherein the indication of the PUCCH repetition type is received via a downlink control information (DCI) message.

18. The method of claim 11, further comprising:
  receiving a physical downlink control channel (PDCCH) message, the PDCCH message associated with an aggregation level and the PDCCH message scheduling a physical uplink shared channel (PUSCH) message;
  determining a number of repetitions of the PUSCH message based on the aggregation level associated with the PDCCH message; and
  repeating a transmission of the PUSCH message based on the aggregation level of the PDCCH.

* * * * *